US012577133B2

(12) United States Patent
Kullberg et al.

(10) Patent No.: US 12,577,133 B2
(45) Date of Patent: Mar. 17, 2026

(54) PROCESS FOR REMOVAL OF PFAS FROM WATER

(71) Applicant: CHROMAFORA AB, Hägersten (SE)

(72) Inventors: Martin Kullberg, Liden (SE); Karin Löfstrand, Saltsjö-Boo (SE); Gaston Lavén, Stockholm (SE)

(73) Assignee: CHROMAFORA AB, Hägersten (SE)

( * ) Notice: Subject to any disclaimer, the term of this patent is extended or adjusted under 35 U.S.C. 154(b) by 588 days.

(21) Appl. No.: 17/619,625

(22) PCT Filed: Jun. 25, 2020

(86) PCT No.: PCT/EP2020/067884
§ 371 (c)(1),
(2) Date: Dec. 16, 2021

(87) PCT Pub. No.: WO2020/260487
PCT Pub. Date: Dec. 30, 2020

(65) Prior Publication Data
US 2022/0298029 A1 Sep. 22, 2022

(30) Foreign Application Priority Data

Jun. 26, 2019 (EP) ..................................... 19182569

(51) Int. Cl.
*C02F 1/44* (2023.01)
*B01D 61/14* (2006.01)
(Continued)

(52) U.S. Cl.
CPC ............ *C02F 1/444* (2013.01); *B01D 61/145* (2013.01); *B01D 61/16* (2013.01); *B01D 69/02* (2013.01);
(Continued)

(58) Field of Classification Search
None
See application file for complete search history.

(56) References Cited

U.S. PATENT DOCUMENTS 5,484,531 A * 1/1996 Kuehne ................ B01D 61/025
210/651
6,518,442 B1 * 2/2003 Felix ........................ C02F 1/547
562/605
(Continued)

FOREIGN PATENT DOCUMENTS

CN 108249521 A 7/2018
EP 1873171 A1 1/2008
(Continued)

OTHER PUBLICATIONS

Cassiday, L. "Emulsions: making oil and water mix", AOCS, Apr. 2014, https://www.aocs.org/stay-informed/inform-magazine/featured-articles/emulsions-making-oil-and-water-mix-april-2014?SSO=True. Accessed May 20, 2024. (Year: 2014).*
(Continued)

*Primary Examiner* — Magali P Slawski
*Assistant Examiner* — Marriah CG Ellington
(74) *Attorney, Agent, or Firm* — Renner, Otto, Boisselle & Sklar, LLP

(57) ABSTRACT

A method for removing PFAS from a PFAS-containing aqueous phase, comprising adding to said aqueous phase a surfactant composition comprising at least one cationic surfactant, to allow the surfactant to form micelles in said aqueous phase, and bringing said micelle-containing aqueous phase in contact with an ultrafiltration membrane under pressure, to obtain a permeate flow aqueous phase having a reduced concentration of PFAS.

17 Claims, 6 Drawing Sheets

(51) Int. Cl.

| | |
|---|---|
| B01D 61/16 | (2006.01) |
| B01D 69/02 | (2006.01) |
| C02F 1/54 | (2023.01) |
| C02F 101/36 | (2006.01) |
| C02F 103/06 | (2006.01) |

(52) U.S. Cl.
CPC .......... C02F 1/547 (2013.01); B01D 2311/04 (2013.01); B01D 2311/12 (2013.01); B01D 2311/2642 (2013.01); B01D 2325/20 (2013.01); C02F 2101/36 (2013.01); C02F 2103/06 (2013.01); C02F 2305/04 (2013.01)

(56) References Cited

U.S. PATENT DOCUMENTS

| | | | |
|---|---|---|---|
| 8,002,988 B2 | 8/2011 | Somasundaran et al. | |
| 9,868,097 B2 * | 1/2018 | Yanagisawa | ......... A61K 47/183 |
| 2003/0098282 A1 * | 5/2003 | Funaki | .................. C02F 1/5245 |
| | | | 210/665 |
| 2006/0041051 A1 * | 2/2006 | Nakatani | ................. C08F 14/26 |
| | | | 524/544 |
| 2006/0135681 A1 * | 6/2006 | Cavanaugh | .......... C09D 127/18 |
| | | | 524/544 |
| 2008/0308495 A1 | 12/2008 | Somasundaran et al. | |

FOREIGN PATENT DOCUMENTS

| | | | | |
|---|---|---|---|---|
| JP | H05317654 A | 12/1993 | | |
| JP | 2003326143 A | 11/2003 | | |
| JP | 2010119940 A | 6/2010 | | |
| WO | WO-2010025552 A1 * | 3/2010 | .......... | C09K 23/017 |

OTHER PUBLICATIONS

X. Hang et al. "Removal and recovery of perfluorooctanoate from wastewater by nanofiltration" Separation and Purification Technology 145 (2015) 120â129 (Year: 2015).*

Kucharzyk et al."Novel treatment technologies for PFAS compounds: A critical review". Journal of Environmental Management 204 (2017) 757-764. (Year: 2017).*

Acero et al. "Removal of emerging contaminants from secondary effluents by micellar-enhanced ultrafiltration". Separation and Purification Technology 181 (2017) 123â131 (Year: 2017).*

USEPA, 2012. Emerging Contaminants—Perfluorooctane Sulfonate (PFOS) and Perfluorooctanoic Acid (PFOA), pp. 1-6 (Year: 2012).*

GenapolÂ® UD 088 Fact Sheet (Year: 2023).*

Coulson and Richardson's Chemical Engineering Ch 13: Colloidal Dispersions. https://doi.org/10.1016/B978-0-08-101098-3.00014-7, 2019, Elsevier Ltd. (Year: 2019).*

J.-C. Lin et al. / Ultrasonics Sonochemistry 28 (2016) 130-135. Accessed Jul. 9, 2025. http://dx.doi.org/10.1016/j.ultsonch.2015.07. 007 (Year: 2016).*

International Search Report mailed Jul. 10, 2020 in corresponding International Application No. PCT/PE2020/067884.

Written Opinion mailed Jul. 10, 2020 in corresponding International Application No. PCT/PE2020/067884.

Clever, et al., "Process water production from river water by ultrafiltration and reverse osmosis". Desalination. Dec. 2000, 131 (1-3), pp. 325-336.

Kandori, et al., "Selection of surfactants for micellar-enhanced ultrafiltration", Separation Science and Technology (1990), 25 (1-2), 83-108.

Puasa, et al. "An overview of Micellar-Enhanced Ultrafiltration in Wastewater Treatment Process", IPCBEE vol. 12 (2011), pp. 167-172.

Lehmler, "Synthesis of environmentally relevant fluorinated surfactants—a review". Chemosphere, 2005, 58 (11): pp. 1471-1496.

Renner, "The long and the short of perfluorinated replacements". Environ. Sci. Technol. 40 (1), pp. 12-13.

Calafat, et al., "Polyfluoroalkyl chemicals in the U.S. population: data from the National Health and Nutrition Examination Survey (NHANES) 2003-2004 and comparisons with NHANES 1999-2000". Environ. Health Perspect, 2007, 115 (11): pp. 1596-1602.

Berger, et al., "Fish consumption as a source of human exposure to perfluorinated alkyl substances in Sweden—Analysis of edible fish from Lake Vattern and the Baltic Sea", Chemosphere, vol. 76, Issue 6, Aug. 2009, pp. 799-804.

McCleaf, et al., "Removal efficiency of multiple poly- and perfluoroalkyl substances (PFASs) in drinking water using granular activated carbon (GAC) and anion exchange (AE) col. tests", Water research, vol. 120, Sep. 1, 2017, pp. 77-87.

Busch, et al., "Polyfluoroalkyl compounds in landfill leachates", Environmental pollution, vol. 158, Issue 5, May 2010, pp. 1467-1471.

"CWSRF Emerging Contaminants—Frequent Questions and Answers", https://www.epa.gov/cwsrf/cwsrf-emerging-contaminants-frequent-questions-and-answers (accessed Mar. 6, 2025).

Acero et al., "Retention of emerging micropollutants from UP water and a municipal secondary effluent by ultrafiltration and nanofiltration" Chemical Engineering Journal vol. 163 (2010), pp. 264-272.

* cited by examiner

FIG. 2

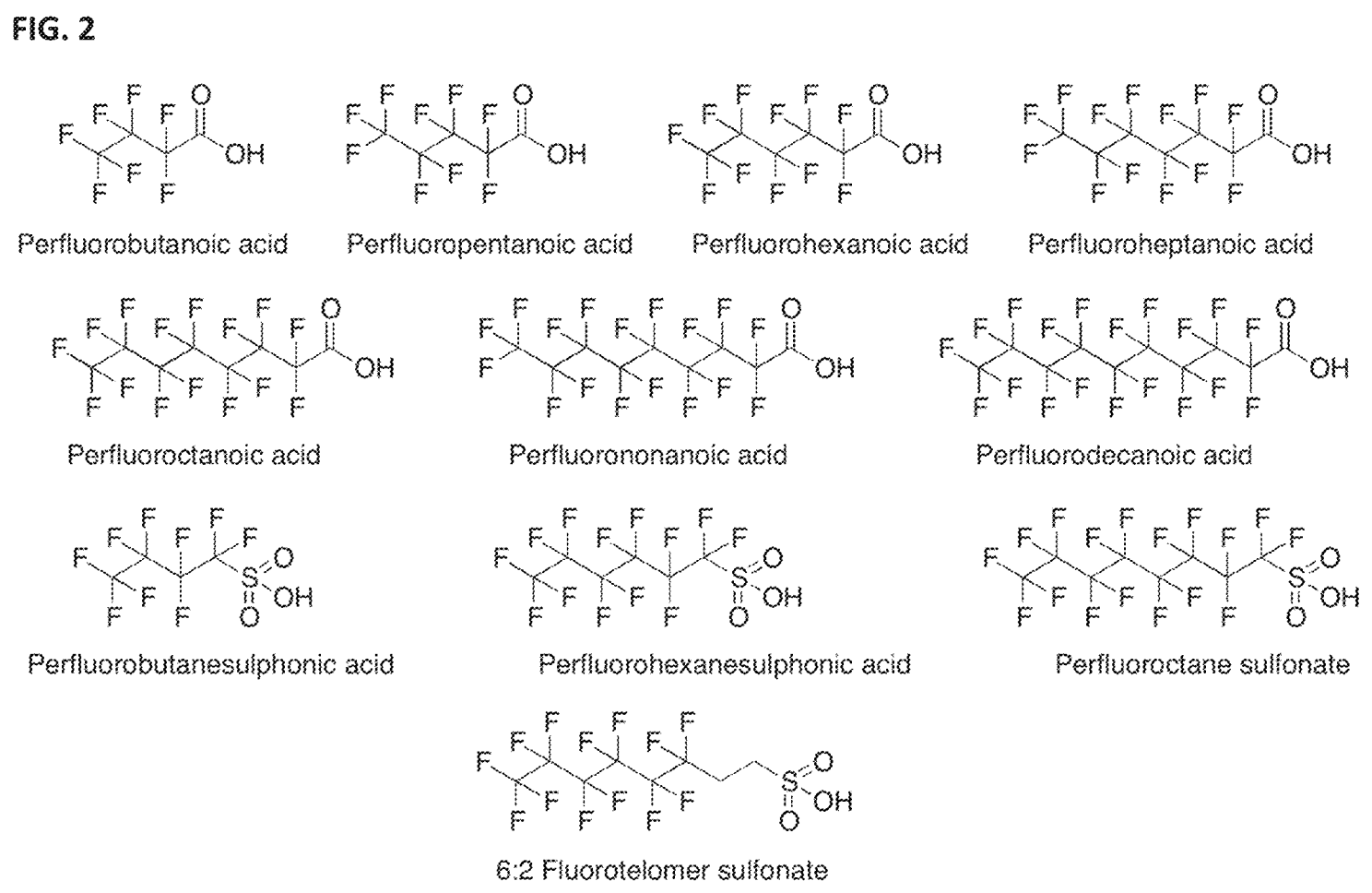

Perfluorobutanoic acid

Perfluoropentanoic acid

Perfluorohexanoic acid

Perfluoroheptanoic acid

Perfluorooctanoic acid

Perfluorononanoic acid

Perfluorodecanoic acid

Perfluorobutanesulphonic acid

Perfluorohexanesulphonic acid

Perfluoroctane sulfonate

6:2 Fluorotelomer sulfonate

FIG. 4

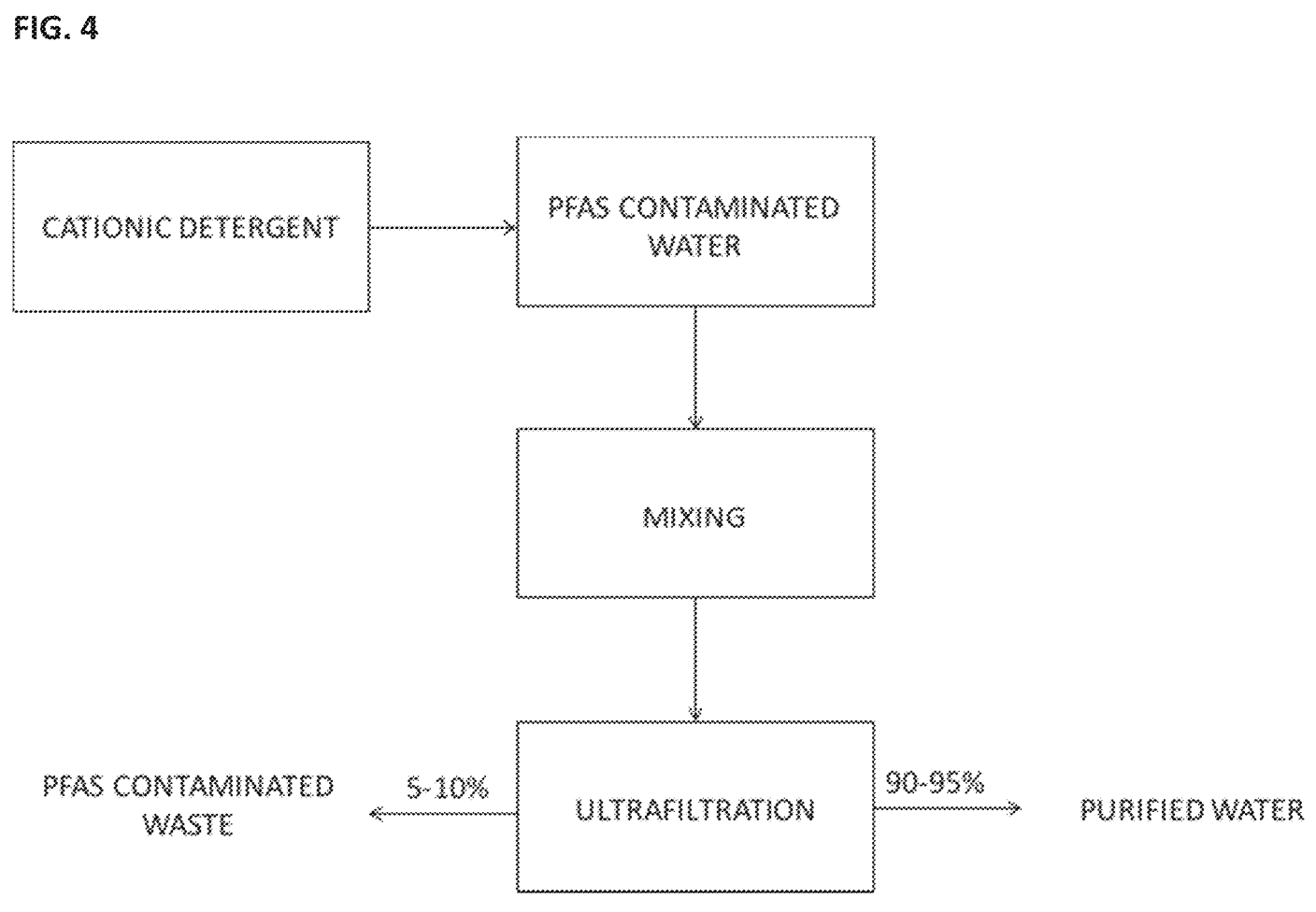

CATIONIC DETERGENT

PFAS CONTAMINATED WATER

MIXING

ULTRAFILTRATION 90-95%

PURIFIED WATER 5-10%

PFAS CONTAMINATED WASTE

PROCESS FOR REMOVAL OF PFAS FROM WATER

This application is a national phase of International Application No. PCT/EP2020/067884 filed Jun. 25, 2020, which claims priority to European Patent Application No. 19182569.4 filed Jun. 26, 2019, the entire disclosures of which are hereby incorporated by reference.

FIELD OF THE INVENTION

The present invention relates to a method for the removal of perfluorinated compounds from water. More particularly, the invention relates to a method for the removal of PFAS from water by use of micellar-enhanced ultrafiltration in combination with addition of cationic surfactants and/or detergents or mixtures of cation surfactants and/or detergents and nonionic surfactants and/or detergents to the water.

BACKGROUND OF THE INVENTION

Ultrafiltration (UF) is a variety of membrane filtration in which forces like pressure or concentration gradients lead to a separation through a semipermeable membrane. Suspended solids and solutes of high molecular weight are retained in the so-called retentate, while water and low molecular weight solutes pass through the membrane in the permeate (filtrate).[1] This separation process is used in industry and research for purifying and concentrating macromolecular solutions,[2] especially protein solutions.[3]

Ultrafiltration can be used for the removal of particulates and macromolecules from raw water to produce potable water. It has been used to either replace existing secondary (coagulation, flocculation, sedimentation) and tertiary filtration (sand filtration and chlorination) systems employed in water treatment plants or as standalone systems in isolated regions with growing populations.[4] It is used by dairy industry to concentrate milk proteins and eliminate water from milk. It is used by biotech industry to concentrate proteins.[5]

Micellar-enhanced ultrafiltration (herein below also: MEUF) is known as a powerful separation process developed recently to remove various contaminants such as heavy metals (e.g. lead, cadmium, or zinc), toxic organic materials (e.g. phenol, di-butyl phosphate, tri-butyl phosphate, or trihalomethane) and lower molecular weight contaminants, including organic dyes.[6, 8]

In MEUF a detergent is added to water at a concentration above the critical micelle concentration of the detergent. When the detergent forms a micelle the hydrophobic parts of the detergent molecules aggregate together and form a hydrophobic space, while the hydrophilic groups of the detergent molecules remain exposed to water.[9] This forms a usually spherical structure with a hydrophilic surface and a hydrophobic interior. The spherical micelle weight is at least 60 000 daltons, which makes it possible to separate the detergent micelles by ultrafiltration. The hydrophilic groups on the surface of the micelle form a phase separation between the hydrophobic inside of the micelle and the water. Since organic pollutants often are quite hydrophobic, they are generally preferably present on the inside of the micelle, and this is the basis of MEUF for removal of pollutants.[7]

PFAS (per- and polyfluoroalkyl substances) is a collective name for over 3000 industrially produced chemicals.

PFAS may be classified as (1) long-chain PFAAs, (2) short-chain PFAAs, (3) non-polymeric and polymeric fluorotelomer-based products, and (4) fluoroplastics and fluoropolymers; where long-chain PFAAs include perfluoroalkane sulfonic acids (PFSAs) with carbon chain lengths of 6 and higher, and perfluorocarboxylic acids (PFCAs) with carbon chain lengths of 8 and higher; and short-chain PFAAs, include PFSAs with carbon chain lengths of 5 and lower, and PFCAs with carbon chain lengths of 7 and lower.

The most common PFAS are perfluorobutanoic acid, perfluoropentanoic acid, perfluorohexanoic acid, perfluoroheptanoic acid, perfluorooctanoic acid, perfluorononanoic acid, perfluorodecanoic acid, perfluorobutanesulphonic acid, perfluorohexanesulphonic acid, perfluorooctanesulphonic acid, 6:2 fluorotelomer sulfonate, perfluoroundecanoic acid, perfluorododecanoic acid, perfluorotridecanoic acid, perfluorotetradecanoic acid, perfluoropentanesulphonic acid, perfluoroheptanesulphonic acid, perfluorononanesulphonic acid, perfluorodecanesulphonic acid, perfluorododecanesulphonic acid, 4:2 fluorotelomer sulfonate, 8:2 fluorotelomer sulfonate, perfluorooctanesulphone amide, N-methyl perfluorooctanesulphone amide, N-ethyl perfluorooctanesulphone amide, N-methyl perfluorooctanesulphone amide ethanol, N-ethylperfluorooctanesulphone amide ethanol, perfluorooctanesulphone amide acetate, N-methyl perfluorooctanesulphone amide acetate, N-ethyl perfluorooctanesulphone amide acetate, 7H-perfluoroheptanoic acid, perfluoro-3,7-dimethyloctanoic acid and isomers, homologs and other permutations of these substances.

The most common measure for PFAS is the so-called "PFAS Sum 11", directed to 11 of the most common PFAS, which are: perfluorobutanoic acid, perfluoropentanoic acid, perfluorohexanoic acid, perfluoroheptanoic acid, perfluorooctanoic acid, perfluorononanoic acid, perfluorodecanoic acid, perfluorobutanesulphonic acid, perfluorohexanesulphonic acid, perfluorooctanesulphonic acid, 6:2 fluorotelomer sulfonate.

PFAS are used globally in a large number of products such as firefighting and impregnating agents. PFAS are widely dispersed in the environment; they are persistent and some are toxic. PFAS contaminated land is found in many places in the world, where PFAS leak to groundwater and drinking water reservoirs. Recent research has shown several health problems with PFAS, and PFAS thresholds in drinking water are under way.[10-12]

PFAS are all created by man and the supply to nature comes exclusively from human activity. They occur globally in a large number of production processes, e.g. as fabric protecting agents. For example, the most common point sources of PFAS in the Swedish environment is fire extinguishing foam used on airfields. The military airfields are the most numerous sources of PFAS that leak into the environment, closely followed by civilian airfields. Since PFAS are not degraded in nature and several PFAS have bioaccumulative properties, it is necessary to combat this contamination with active measures in addition to limiting their use.

PFAS enter the population via contaminated drinking water, via foods such as fish and livestock, through irrigation of crops with contaminated water and through inhalation of dust.[13] PFAS may cause hepatic and reproductive toxicity in humans. The largest study has been conducted on approximately 60,000 people in the United States who received high amounts of the highly fluorinated substance PFOA (perfluorooctanoic acid) from drinking water. The study's conclusion was that there is a probable link between the studied population's PFOA exposure and high blood cholesterol levels, high blood pressure during pregnancy, ulcerative colitis, thyroid disease, and cancer of the testes and kidneys (C8 Science Panel 2013).

The water soluble PFAS that are most common in the environment have a negatively charged part which makes them soluble in water. Common PFAS such as perfluorobutanoic acid, perfluorooctane sulfonic acid, and fluorotelomer sulfonate are all present in high concentration at most contaminated sites. These perfluoro molecules are extremely difficult to break down, they cannot be removed by biological wastewater treatment methods and they are resistant to oxidation by ozone water treatment.

Common methods for removal of PFAS from water are different types of carbon filtration, often Granulated Activated Carbon (GAC) filtration. Carbon filtration is efficient for the long chain PFAS molecules perfluorooctanoic acid, perfluorononanoic acid, perfluorodecanoic acid, perfluorooctanesulphonic acid, 6:2 fluorotelomer sulfonate, perfluoroundecanoic acid, perfluorododecanoic acid, perfluorotridecanoic acid, perfluorotetradecanoic acid, perfluorononanesulphonic acid, perfluorodecanesulphonic acid, perfluorododecanesulphonic acid, 4:2 fluorotelomer sulfonate, 8:2 fluorotelomer sulfonate, perfluorooctanesulphone amide, N-methyl perfluorooctanesulphone amide, N-ethyl perfluorooctanesulphone amide, N-methyl perfluorosulphone amide ethanol, N-ethylperfluoroctanesulphone amide ethanol, perfluorooctanesulphone amide acetate, N-methyl perfluorooctanesulphone amide acetate, N-ethyl perfluorooctanesulphone amide acetate, 7H-perfluoroheptanoic acid and perfluoro-3,7-dimethyloctanoic acid. GAC and other carbon filtration methods are however less efficient when it comes to the shorter PFAS molecules such as perfluorobutanoic acid, perfluoropentanoic acid, perfluorohexanoic acid, perfluoroheptanoic acid, perfluoropentanesulphonic acid and perfluoroheptanesulphonic acid. Should there be high concentrations of low molecular weight PFAS molecules in a wastewater stream it becomes necessary to change carbon filters at a more frequent interval; should the water also contain high levels of organic matter this leads to necessity for even more frequent changing of the carbon filters.[14]

Another proposed method for treating PFAS contaminated wastewater is reverse osmosis (RO). Reverse osmosis can separate individual metal ions from water with high efficiency and has been proved to be able to remove all types of PFAS from water.[15] However, drawbacks with RO is that RO cannot filter water with high ion concentrations. Indeed, since RO relies on osmotic mobility over the membrane, if salt concentration in the water treated is high, very little osmotic mobility over the membrane can be achieved with normal pressure. The efficiency of RO can be fairly high, but very seldom efficiency over 90% can be achieved, which means that at best, RO can reduce the amount of waste volume by 90%;

more commonly this volume is around 75-80%. Compared to ultrafiltration, RO consumes more energy. A further drawback of RO is that it often needs an ultrafiltration unit as prefiltration, adding to the complexity of the system.

It appears that there remains an urgent and increasing need for methods for efficiently removing PFAS from water.

SUMMARY OF THE INVENTION

A method for removing PFAS from water is disclosed herein. The method advantageously is generally useful for all types PFAS, regardless of e.g. the molecular weight of the PFAS, at an improved efficiency and reduced waste volume. The method also is generally useful for removing PFAS from any type of PFAS-containing water, such as drainage water, leach water, process water, groundwater, etc., i.e.

generally any type of PFAS-containing aqueous phase. The method of the invention therefore allows to obtain water of improved purity, in terms of decreased PFAS contamination.

Thus, disclosed herein is a method for removing PFAS from a PFAS-containing aqueous phase, comprising
   (i) adding to said aqueous phase a surfactant composition comprising at least one cationic surfactant, to allow the surfactant to form micelles in said aqueous phase; and
   (ii) bringing said micelle-containing aqueous phase in contact with an ultrafiltration membrane under pressure, to obtain a permeate flow aqueous phase having a reduced concentration of PFAS.

In some embodiments, the method for removing PFAS from a PFAS-containing aqueous phase comprises
   (i) adding to said aqueous phase a surfactant composition comprising at least one cationic surfactant, to allow the surfactant to form micelles in said aqueous phase;
   (ii) bringing said micelle-containing aqueous phase in contact with an ultrafiltration membrane under pressure, to obtain a permeate flow aqueous phase having a reduced concentration of PFAS; and optionally
   (iii) repeating (i) and (ii) at least once.

In some embodiments, (i) and (ii) are repeated at least once. In some embodiments, (i) and (ii) are repeated once. In some embodiments (i) and (ii) are repeated more than once.

In some embodiments, the method for removing PFAS from a PFAS-containing aqueous phase comprises
   (i) adding to said aqueous phase a surfactant composition comprising at least one cationic surfactant, to allow the surfactant to form micelles in said aqueous phase,
   (ii) bringing said micelle-containing aqueous phase in contact with an ultrafiltration membrane under pressure, to obtain a permeate flow aqueous phase having a reduced concentration of PFAS,
   (iii) optionally determining a concentration of one or more PFAS in the permeate flow aqueous phase having a reduced concentration of PFAS, and
   (iv) optionally repeating (i)-(iii) if a determined concentration is higher than a predetermined threshold value.

In some embodiments, the method for removing PFAS from a PFAS-containing aqueous phase comprises
   (i) adding to said aqueous phase a surfactant composition comprising at least one cationic surfactant, to allow the surfactant to form micelles in said aqueous phase,
   (ii) bringing said micelle-containing aqueous phase in contact with an ultrafiltration membrane under pressure, to obtain a permeate flow aqueous phase having a reduced concentration of PFAS,
   (iii) determining a concentration of one or more PFAS in the permeate flow aqueous phase having a reduced concentration of PFAS, and
   (iv) repeating (i)-(iii) if a determined concentration is higher than a predetermined threshold value.

The method of the invention, allows for water of various types being purified from PFAS to a very low or even negligible residual level of PFAS, which is important in view of the persistence of PFAS in the environment and the toxic effect thereof on animals and humans.

BRIEF DESCRIPTION OF THE DRAWINGS

FIG. 2 shows the chemical structure of the most common PFAS, the so-called "PFAS Sum 11".

FIG. 4 is a block diagram schematically representing an ultrafiltration procedure as disclosed herein for removing PFAS from PFAS-containing water.

DETAILED DESCRIPTION OF THE INVENTION

Definitions

Figure 1A:
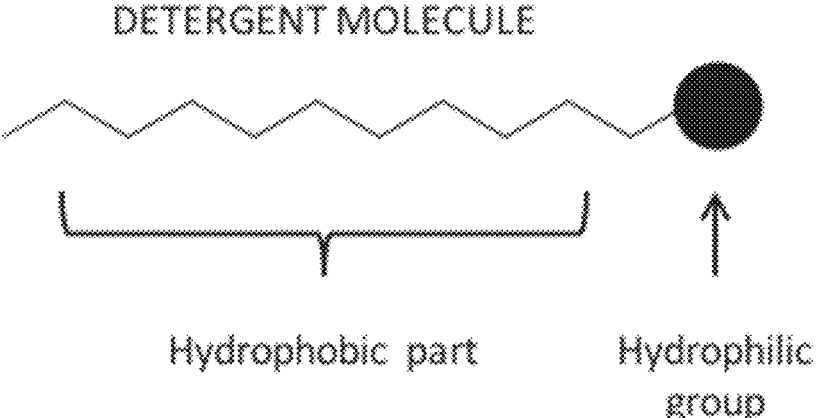
FIG. 1A illustrates schematically a surfactant molecule, with a hydrophilic head and a hydrophobic tail.

As used herein a "surfactant" refers to an organic chemical compound that lowers the surface tension (or interfacial tension) between two liquids, between a gas and a liquid, or between a liquid and a solid. A surfactant is an amphiphilic compound, i.e. a compound that contains a hydrophobic moiety ("the hydrophobic tail") as well as a hydrophilic moiety (the "hydrophilic head" or "polar head") (cf. FIG. 1A).

Most commonly, surfactants are classified according to the hydrophilic head. A "non-ionic surfactant" has no electrically charged groups in its head; the hydrophilic head of a "cationic surfactant" carries a net positive electrical charge, and the hydrophilic head of an "anionic surfactant" carries a net negative electrical charge.

Figure 1B:
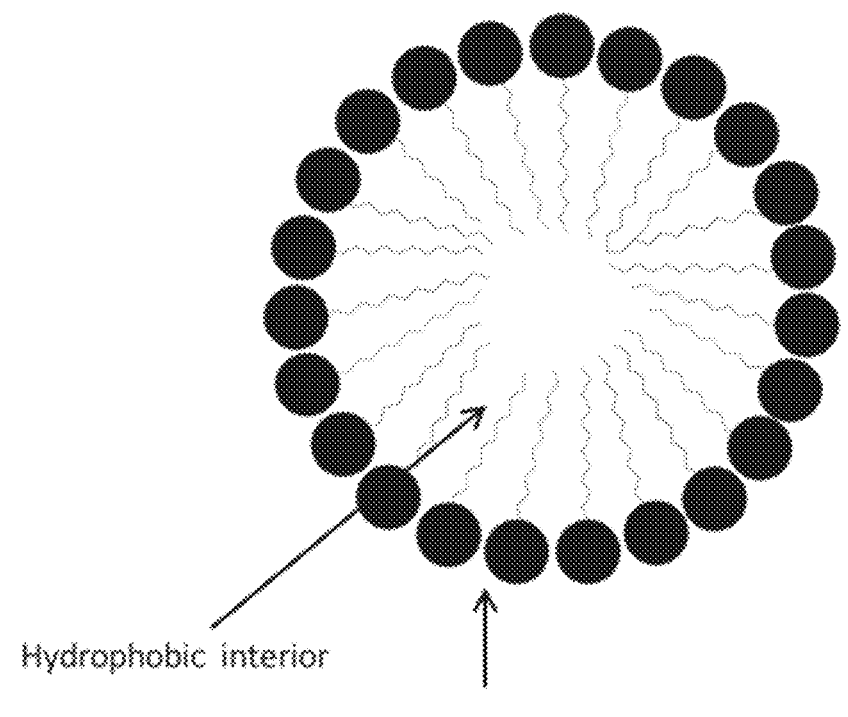
FIG. 1B illustrates schematically a micellar structure as formed by several surfactant molecules, with a hydrophilic surface and a hydrophobic interior.

As used herein "micelle" refers to an aggregate, or supramolecular assembly, of surfactant molecules dispersed in a liquid phase. A typical micelle in aqueous solution forms an aggregate with the hydrophilic moieties ("hydrophilic heads") in contact with surrounding liquid phase, sequestering the hydrophobic moieties ("hydrophobic tails") in the micelle centre, cf. FIG. 1B.

As used herein "critical micelle concentration" ("CMC") refers to the concentration of surfactant in a liquid phase at which formation of micelles occurs.

As used herein "hydrophilic" refers to the characteristic of having affinity for water, i.e. a tendency to dissolve in water.

As used herein "hydrophobic" refers to the characteristic of tending to repel or fail to mix with water.

As used herein, "ultrafiltration" refers to a process wherein a liquid is placed in contact, typically under some head of pressure, with a semipermeable membrane (the ultrafiltration membrane) containing pores of a specified size (the cut-off size), whereby molecules or complexes having a size below the cut-off size of the membrane are capable of passing through the pores, whereas molecules or complexes having a size larger than the cut-off size of the membrane do not pass through the pores, but are retained on the upstream side of the membrane.

As used herein, "retentate" refers to the molecules or complexes that, during ultrafiltration, have not passed through the pores of semipermeable membrane, but are retained on the upstream side of the membrane.

As used herein, "permeate" refers to the molecules or complexes that, during ultrafiltration, have passed through the pores of semipermeable membrane.

The term "cut-off size" or "molecular weight cut-off" as used herein with respect to ultrafiltration membranes refers to the molecular weight of a molecule or particle of which 90% is retained by the membrane.

A dalton (Da) is a unit of mass equal to one twelfth of the mass of an atom of $^{12}C$. It is equivalent to approximately $1.66 \times 10^{-27}$ kg.

The unit kDa corresponds to $10^3$ daltons. As used herein "CTAC" refers to cetyl trimethylammonium chloride.

As used herein "CTAB" refers to cetyl trimethylammonium bromide.

As used herein "SDS" refers to sodium dodecylsulfonate.

As used herein "PFAS Sum 11" refers to perfluorobutanoic acid, perfluoropentanoic acid, perfluorohexanoic acid, perfluoroheptanoic acid, perfluorooctanoic acid, perfluorononanoic acid, perfluorodecanoic acid, perfluorobutanesulphonic acid, perfluorohexanesulphonic acid, perfluorooctanesulphonic acid, and 6:2 fluorotelomer sulfonate.

As used herein "PFAS" refers to perfluoroalkyl (or polyfluoroalkyl) substances. While thus the term "PFAS" is a collective reference to a class of compounds, the term may herein be used to refer to one only such compound, as well as to a mixture of more than one such compounds. For example, the PFAS referred to herein e.g. may comprise one or more of perfluorobutanoic acid, perfluoropentanoic acid, perfluorohexanoic acid, perfluoroheptanoic acid, perfluorooctanoic acid, perfluorononanoic acid, perfluorodecanoic acid, perfluorobutanesulphonic acid, perfluorohexanesulphonic acid, perfluorooctanesulphonic acid, 6:2 fluorotelomer sulfonate, perfluoroundecanoic acid, perfluorododecanoic acid, perfluorotridecanoic acid, perfluorotetradecanoic acid, perfluoropentanesulphonic acid, perfluoroheptanesulphonic acid, perfluorononanesulphonic acid, perfluorodecanesulphonic acid, perfluorododecanesulphonic acid, 4:2 fluorotelomer sulfonate, 8:2 fluorotelomer sulfonate, perfluorooctanesulphone amide, N-methyl perfluorooctanesulphone amide, N-ethyl perfluorooctanesulphone amide, N-methyl perfluorooctanesulphone amide ethanol, N-ethyl perfluorooctanesulphone amide ethanol, perfluorooctanesulphone amide acetate, N-methyl perfluorooctanesulphone amide acetate, N-ethyl perfluorooctanesulphone amide acetate, 7H-perfluoroheptanoic acid, and perfluoro-3,7-dimethyloctanoic acid, and isomers, homologs and other variations and combinations of these substances.

The term "PFAA" refers to a perfluoroalkyl acid (or polyfluoroalkyl acid).

The term "PFSA" refers to a perfluoroalkyl sulphonic acid (or polyfluoroalkyl sulphonic acid).

The term "PFCA" refers to a perfluoroalkyl carboxylic acid (or polyfluoroalkyl carboxylic acid).

Generally, as used herein, the term PFAS does not refer to polymeric substances, i.e. as generally used herein, the term PFAS refers to non-polymeric PFAS, in particular water soluble PFAS.

Thus, as used herein, the term PFAS generally refers to one of more non-polymeric PFAS, e.g. long-chain PFAAs, short-chain PFAAs, and non-polymeric fluorotelomer-based products.

The PFAS Containing Water

The aqueous phase that is treated by the method of the invention may be any type of water containing PFAS, e.g. PFAS contaminated water, drainage water, leach water, process water, groundwater and other types of water and/or aqueous solutions containing PFAS. Generally, the aqueous phase containing PFAS to be treated according to the present invention is not an emulsion of PFAS in water. Generally, the aqueous phase contains PFAS dissolved therein.

The concentration of PFAS present in the aqueous phase to be treated may vary over time, e.g. from very low to high. Moreover, the specific types of PFAS present in the water to be treated may be unknown, or may vary, without detracting from the efficacy of the method of the invention.

In some embodiments, the aqueous phase to be treated by the method of the present invention contains one or more of perfluorobutanoic acid, perfluoropentanoic acid, perfluoro-hexanoic acid, perfluoroheptanoic acid, perfluorooctanoic acid, perfluorononanoic acid, perfluorodecanoic acid, per-fluorobutanesulphonic acid, perfluorohexanesulphonic acid, perfluorooctanesulphonic acid, 6:2 fluorotelomer sulfonate, perfluoroundecanoic acid, perfluorododecanoic acid, per-fluorotridecanoic acid, perfluorotetradecanoic acid, perfluo-ropentanesulphonic acid, perfluoroheptanesulphonic acid, perfluorononanesulphonic acid, perfluorodecanesulphonic acid, perfluorododecanesulphonic acid, 4:2 fluorotelomer sulfonate, 8:2 fluorotelomer sulfonate, perfluorooctanesul-phone amide, N-methyl perfluorooctanesulphone amide, N-ethyl perfluorooctanesulphone amide, N-methyl perfluo-rooctanesulphone amide ethanol, N-ethylperfluorooctane-sulphone amide ethanol, perfluorooctanesulphone amide acetate, N-methyl perfluorooctanesulphone amide acetate, N-ethyl perfluorooctanesulphone amide acetate, 7H-perfluo-roheptanoic acid, and perfluoro-3,7-dimethyloctanoic acid, and isomers, homologs and other permutations of these substances.

In some embodiments, the aqueous phase to be treated by the method of the present invention contains one or more of perfluorobutanoic acid, perfluoropentanoic acid, perfluoro-hexanoic acid, perfluoroheptanoic acid, perfluorooctanoic acid, perfluorononanoic acid, perfluorodecanoic acid, per-fluorobutanesulphonic acid, perfluorohexanesulphonic acid, perfluorooctanesulphonic acid, and 6:2 fluorotelomer sulfonate.

In some embodiments, the water to be treated by the method of the present invention contains PFAS at an initial total concentration of at least 10 g/L, or at least 5 g/L, or at least 2 g/L, or at least 1 g/L, or at least 500 mg/L, or at least 200 mg/L, or at least 100 mg/L, or at least 50 mg/L, or at least 20 mg/L, or at least 10 mg/L, or at least 5 mg/L, or at least 2 mg/L, or at least 1 mg/L, or at least 500 μg/L, or at least 200 μg/L, or at least 100 μg/L, or at least 50 μg/L, or at least 20 μg/L, or at least 10 μg/L, or at least 5 μg/L, or at least 2 μg/L, or at least 1 μg/L, or at least 0.5 μg/L, or at least 0.2 μg/L, or at least 0.1 μg/L.

In some embodiments, the water to be treated by the method of the present invention contains PFAS at an initial total concentration of at most 10 g/L, or at most 5 g/L, or at most 2 g/L, or at most 1 g/L, or at most 500 mg/L, or at most 200 mg/L, or at most 100 mg/L, or at most 50 mg/L, or at most 20 mg/L, or at most 10 mg/L, or at most 5 mg/L, or at most 2 mg/L, or at most 1 mg/L, or at most 500 μg/L, or at most 200 μg/L, or at most 100 μg/L, or at most 50 μg/L, or at most 20 μg/L.

In some embodiments, the water to be treated by the method of the present invention contains PFAS at an initial concentration within a range from any of the above identi-fied lower limits to any of the above identified higher limits, e.g. an initial concentration ranging from 0.1 μg/L to 10 g/L, from 0.1 μg/L to 5 g/L, from 0.1 μg/L to 2 g/L, from 0.1 μg/L to 1 g/L, from 0.1 μg/L to 500 mg/L, from 0.1 μg/L to 200 mg/L, from 0.1 μg/L to 100 mg/L, from 0.1 μg/L to 50 mg/L, from 0.1 μg/L to 20 mg/L, from 0.1 μg/L to 10 mg/L, from 0.1 μg/L to 5 mg/L, from 0.1 μg/L to 2 mg/L, from 0.1 μg/L to 1 mg/L, from 0.1 μg/L to 500 μg/L, from 0.1 μg/L to 200 μg/L, from 0.1 μg/L to 100 μg/L, from 0.1 μg/L to 50 μg/L, or from 0.1 μg/L to 20 μg/L.

In some of the above embodiments, the water to be treated by the method of the present invention contains PFAS at an initial concentration of at least 0.2 μg/L, or at least 0.5 μg/L, or at least 1 μg/L, or at least 2 μg/L, or at least 5 μg/L, or at least 10 μg/L.

Thus, in some embodiments, the water to be treated by the method of the present invention contains PFAS at an initial concentration ranging from 0.2 μg/L, or 0.5 μg/L, or 1 μg/L, or 2 μg/L, or 5 μg/L, or 10 μg/L, to 10 g/L, from 0.2 μg/L, or 0.5 μg/L, or 1 μg/L, or 2 μg/L, or 5 μg/L, or 10 μg/L, to 5 g/L.

In some embodiments, the water to be treated by the method of the present invention contains PFAS at an initial concentration ranging from 0.2 μg/L, or 0.5 μg/L, or 1 μg/L, or 2 μg/L, or 5 μg/L, or 10 μg/L, to 2 g/L, from 0.2 μg/L, or 0.5 μg/L, or 1 μg/L, or 2 μg/L, or 5 μg/L, or 10 μg/L, to 1 g/L.

In some embodiments, the water to be treated by the method of the present invention contains PFAS at an initial concentration ranging from 0.2 μg/L, or 0.5 μg/L, or 1 μg/L, or 2 μg/L, or 5 μg/L, or 10 μg/L, to 500 mg/L, from 0.2 μg/L, or 0.5 μg/L, or 1 μg/L, or 2 μg/L, or 5 μg/L, or 10 μg/L, to 200 mg/L.

In some embodiments, the water to be treated by the method of the present invention contains PFAS at an initial concentration ranging from 0.2 μg/L, or 0.5 μg/L, or 1 μg/L, or 2 μg/L, or 5 μg/L, or 10 μg/L, to 100 mg/L.

In some embodiments, the water to be treated by the method of the present invention contains PFAS at an initial concentration ranging from 0.2 μg/L, or 0.5 μg/L, or 1 μg/L, or 2 μg/L, or 5 μg/L, or 10 μg/L, to 50 mg/L, from 0.2 μg/L, or 0.5 μg/L, or 1 μg/L, or 2 μg/L, or 5 μg/L, or 10 μg/L, to 20 mg/L.

In some embodiments, the water to be treated by the method of the present invention contains PFAS at an initial concentration ranging from 0.2 μg/L, or 0.5 μg/L, or 1 μg/L, or 2 μg/L, or 5 μg/L, or 10 μg/L, to 10 mg/L.

In some embodiments, the water to be treated by the method of the present invention contains PFAS at an initial concentration ranging from 0.2 μg/L, or 0.5 μg/L, or 1 μg/L, or 2 μg/L, or 5 μg/L, or 10 μg/L, to 5 mg/L.

In some embodiments, the water to be treated by the method of the present invention contains PFAS at an initial concentration ranging from 0.2 μg/L, or 0.5 μg/L, or 1 μg/L, or 2 μg/L, or 5 μg/L, or 10 μg/L, to 2 mg/L.

In some embodiments, the water to be treated by the method of the present invention contains PFAS at an initial concentration ranging from 0.2 μg/L, or 0.5 μg/L, or 1 μg/L, or 2 μg/L, or 5 μg/L, or 10 μg/L, to 1 mg/L.

In some embodiments, the water to be treated by the method of the present invention contains PFAS at an initial concentration ranging from 0.2 µg/L, or 0.5 µg/L, or 1 µg/L, or 2 µg/L, or 5 µg/L, or 10 µg/L, to 500 µg/L.

In some embodiments, the water to be treated by the method of the present invention contains PFAS at an initial concentration ranging from 0.2 µg/L, or 0.5 µg/L, or 1 µg/L, or 2 µg/L, or 5 µg/L, or 10 µg/L, to 200 µg/L.

In some embodiments, the water to be treated by the method of the present invention contains PFAS at an initial concentration ranging from 0.2 µg/L, or 0.5 µg/L, or 1 µg/L, or 2 µg/L, or 5 µg/L, or 10 µg/L, to 100 µg/L.

In some embodiments, the water to be treated by the method of the present invention contains PFAS at an initial concentration ranging from 0.2 µg/L, or 0.5 µg/L, or 1 µg/L, or 2 µg/L, or 5 µg/L, or 10 µg/L, to 50 µg/L.

In some embodiments, the water to be treated by the method of the present invention contains PFAS at an initial concentration ranging from 0.2 µg/L, or 0.5 µg/L, or 1 µg/L, or 2 µg/L, or 5 µg/L, or 10 µg/L, to 20 µg/L.

In some embodiments, the initial concentration of PFAS is determined by measuring the initial concentration of at least one PFAS selected from PFAS Sum 11 and taking the measured value as a value of the total initial PFAS concentration.

In some embodiments, the initial concentration of PFAS is determined by measuring the initial total concentration of PFAS Sum 11 and taking the measured value as a value of the total initial PFAS concentration.

In some embodiments, the initial concentration of PFAS is determined by measuring the initial concentration of PFAS Sum 11, multiplying the measured value by a factor k, e.g. a factor k ranging from 1.2 to 10, or from 1.2 to 5, or from 1.2 to 4, or from 1.2 to 3, or from 1.2 to 3, or from 1.2 to 2, or from 1.2 to 1.5, and taking the calculated value as a value of the total initial PFAS concentration. The particular factor k may be determined for each type of water, e.g. by determining, for the particular type of water, a mean total concentration of PFAS (e.g. excluding polymeric PFAS) in said water, and a mean concentration of PFAS Sum 11.

The Surfactant Composition

In order to achieve efficient separation of PFAS from the aqueous phase, a surfactant composition comprising at least one cationic surfactant is admixed with said aqueous phase, to allow the formation of micelles in the aqueous phase.

As used herein, the term "surfactant composition" may refer to one specific surfactant compound or to a mixture of surfactant compounds, optionally in a liquid carrier, such as water. Thus, in some embodiments, the method of the invention comprises (i) adding a cationic surfactant to the PFAS-containing aqueous phase, to form micelles in said aqueous phase, and (ii) submitting the aqueous phase to ultrafiltration, e.g. as described herein.

In some other embodiments, the method of the invention comprises (i) adding a mixture of cationic surfactants to the PFAS-containing aqueous phase, to form micelles in said aqueous phase, and (ii) submitting the aqueous phase to ultrafiltration, e.g. as described herein.

In some embodiments, in addition to the cationic surfactant or the mixture of cationic surfactants, the surfactant composition additionally comprises a nonionic surfactant or a mixture of nonionic surfactants. For example, the surfactant composition comprises cationic surfactant(s) and nonionic surfactant(s) in a weight ratio of cationic surfactant(s) to nonionic surfactant(s) of from 100:1 to 1:100, or from 50:1 to 1:50, or from 20:1 to 1:20, or from 10:1 to 1:10, or from 5:1 to 1:5, e.g. from 2:1 to 1:2.

In some further embodiments, the surfactant composition comprises cationic surfactant(s) and nonionic surfactant(s) in a weight ratio of cationic surfactant(s) to nonionic surfactant(s) of from 100:1 to 1:1, or from 50:1 to 1:1, or from 20:1 to 1:1, or from 10:1 to 1:1, or from 5:1 to 1:1, e.g. from 2:1 to 1:1.

In some further embodiments, the surfactant composition comprises cationic surfactant(s) and nonionic surfactant(s) in a weight ratio of cationic surfactant(s) to nonionic surfactant(s) of from 100:1 to 2:1, or from 50:1 to 2:1, or from 20:1 to 2:1, or from 10:1 to 2:1, or from 5:1 to 2:1.

In some further embodiments, the surfactant composition comprises cationic surfactant(s) and nonionic surfactant(s) in a weight ratio of cationic surfactant(s) to nonionic surfactant(s) of from 100:1 to 5:1, or from 50:1 to 5:1, or from 20:1 to 5:1, or from 10:1 to 5:1.

In some further embodiments, the surfactant composition comprises cationic surfactant(s) and nonionic surfactant(s) in a weight ratio of cationic surfactant(s) to nonionic surfactant(s) of from 1:1 to 1:100, or from 1:1 to 1:50, or from 1:1 to 1:20, or from 1:1 to 1:10, or from 1:1 to 1:5, e.g. from 1:1 to 1:2.

In some further embodiments, the surfactant composition comprises cationic surfactant(s) and nonionic surfactant(s) in a weight ratio of cationic surfactant(s) to nonionic surfactant(s) of from 1:2 to 1:100, or from 1:2 to 1:50, or from 1:2 to 1:20, or from 1:2 to 1:10, or from 1:2 to 1:5.

In some further embodiments, the surfactant composition comprises cationic surfactant(s) and nonionic surfactant(s) in a weight ratio of cationic surfactant(s) to nonionic surfactant(s) of from 1:5 to 1:100, or from 1:5 to 1:50, or from 1:5 to 1:20, or from 1:5 to 1:10.

In some embodiments, the surfactant composition comprises only cationic surfactant(s).

The Cationic Surfactant

Any cationic surfactant or mixture of cationic surfactants is considered as generally useful in the method of the invention. As noted herein above, a surfactant comprises a hydrophobic moiety and a hydrophilic moiety. The hydrophobic moiety of a surfactant useful herein is generally a C4-C20 hydrocarbyl group, e.g. an alkyl group of containing 4 to 20 carbon atoms such as, butyl, pentyl, hexyl, heptyl, octyl, nonyl, decanyl, undecanyl, dodecanyl, tridecanyl, tetradecanyl, pentadecanyl, hexadecanyl, heptadecanyl, octadecenyl, nonadecanyl, and acosanyl. The hydrophilic moiety of a cationic surfactant as used herein e.g. may be selected from amonium, methylammonium, dimethylammonium, trimethylammonium, hydroxyethylammonium, methyl hydroxyethylammonium, and dimethyl hydroxyethylammonium.

For example, in some embodiments, the surfactant composition comprises a quaternary ammonium salt of the general formula $R_4N^+$ (e.g. as a $Cl^-$ or Br salt), where at least one R is a hydrophobic moiety, e.g. a C10-C20 alkyl chain, and wherein the R groups may additionally contain N—C or O—C bonds, and may be branched or linear, substituted or unsubstituted, saturated or unsaturated, and aromatic or aliphatic. Examples of cationic surfactants are e.g. C10-C20 alkyltrimethylammonium salts, e.g. C10-C20 alkyltrimethylammonium halides.

In some embodiments, the surfactant composition comprises a cationic surfactant selected from cetyltrimethylammonium bromide and cetyltrimethylammonium chloride. It should be realized, however, that the present invention is not limited to any particular type of cationic surfactant. Furthermore, as pointed out herein above, unless otherwise indicated or apparent from the context, the reference to a "cationic surfactant" should also be understood to refer a mixture of cationic surfactants.

Additionally, a cationic surfactant can also be a cationic polymeric surfactant, e.g. a cationic polymeric surfactant such as described e.g. in R. A. Wessling & D. M. Pickelman (1981) Cationic Polymeric Surfactants, Journal of Dispersion Science and Technology, 2:2-3, 281-313, the contents of which is incorporated herein in its entirety.

In some embodiments, the surfactant composition comprises cetyltrimethylammonium halide, e.g. CTAB or CTAC.

In some embodiments, the surfactant composition comprises only cationic surfactant(s). In some embodiments, the surfactant composition is one or more cationic surfactants in a liquid carrier, e.g. one or more cationic surfactants in an aqueous liquid carrier.

The Nonionic Surfactant

Examples of nonionic surfactants are alcohol ethoxylates and alkylphenol ethoxylates. Alcohol ethoxylates may be represented by the general formula $R(OCH_2CH_2)_nOH$, wherein R for example may be C9-C18 linear or branched alkyl, and n may be an integer of from 1 to 40, e.g. from 5 to 20. Alkylphenol ethoxylate surfactants may be represented by the general formula $R—(C_6H_4)—(OCH_2CH_2)_nOH$, wherein R for example may be C8-C16 linear or branched alkyl, and n may be an integer of from 1 to 30, e.g. from 5 to 15.

For the purpose of the present invention, and unless otherwise indicated or apparent from the context, the reference to a "nonionic surfactant" should also be understood to include a mixture of nonionic surfactants.

The Ultrafiltration Membrane

Ultrafiltration membranes are typically specified to have a particular cut-off size, or molecular cut-off weight. There are many types of ultrafiltration membranes (or filters) made from various materials, e.g. polyethersulphone, regenerated cellulose, or ceramic materials. In the present invention any type of ultrafiltration technology may be used. Ultrafiltration may be carried out in spiral wound membranes by cross-flow filtration, where a feed stream is introduced into the membrane element under pressure and passed over the membrane surface in a controlled flow path, where the permeate passes through the membrane, whilst the rejected materials may be flushed away as the retentate.

Another common ultrafiltration arrangement is use of hollow fiber membranes. The membrane is formed into long, very thin tubes or fibers (typically 0.6 to 2 mm in diameter) which are sealed into connectors at both ends. Hundreds of these fibers with one inlet and outlet connector are called a "bundle" or "cartridge" and may be grouped together to form a "module". The feed solution typically flows through one end of the fibers while the opposite end is completely or partially closed off, thus forcing the fluid through the membrane where it is collected in the cartridge area surrounding the fibers and leaving the suspended materials on the inside of the membrane.

Thus, in the method of the invention any type of ultrafiltration membrane may be used, e.g. a spiral wound membrane, tubular membrane, hollow fiber membrane or a flat sheet membrane, of a material such as cellulose acetate (CA), polyvinylidene fluoride (PVDF), polyacrylonitrile, polypropylene, polysulfone (PS), polyethersulfone (PES), or other polymers, the membrane can also be made from ceramic material.

Preferably, the ultrafiltration membrane has a molecular weight cutoff of no more than 100000 daltons (100 kD), e.g. preferably no more than 50 kDa, even more preferably no more than 30 kDa, no more than 25 kDa, no more than 20 kDa, no more than 15 kDa, or no more than 10 kDa, e.g. from 1 to 100 kD, from 5 to 50 kD, from 1 to 30 kD, from 1 to 25 kDa, from 1 to 20 kDa, from 1 to 15 kDa, or from 1 to 10 kDa.

The Method

In the method of the invention, a surfactant composition as defined herein is admixed with the PFAS-containing aqueous phase to form surfactant-containing micelles.

The surfactant composition is added in an amount giving rise to formation of micelles, i.e. to achieve at least the critical micelle concentration (CMC) for the surfactant composition in the aqueous phase. In some embodiments, an excess amount of surfactant composition may be added, e.g. an amount of from 10 to 100% (e.g. 20-50%) above the amount estimated as necessary to reach the CMC.

The surfactant composition may be added to the aqueous phase as a liquid solution or in solid (e.g. powder or granule) form, e.g. in the form of a salt to be dissolved in the aqueous phase. Formation of micelles is considered to be a rapid process as far as CMC has been reached. Moreover, once the micelles have been allowed to form, to provide an emulsion of micelles in a PFAS-containing aqueous phase, the micelle-containing aqueous phase can be subjected to ultrafiltration without any substantial delay, i.e. it is considered that the partition of PFAS to the micellar phase occurs quite rapidly, e.g. in a matter of minutes (e.g. 1-10 minutes, or 1-5 minutes, or 2-5 minutes) or less.

The amount of surfactant composition to be added to any particular type of water may be determined by the person of ordinary skill in the art, e.g. by collecting representative samples of the water and determining PFAS before and after ultrafiltration in the presence of a selected surfactant composition at a concentration of at least CMC, optionally testing several different surfactant compositions and/or different surfactant concentrations. Normally, the concentration of PFAS present in any water to be treated is quite low, compared to the CMC of any surfactant, and therefore it is considered that at the CMC, a surfactant composition of the invention will be effective in the inventive method.

The PFAS-contaminated aqueous phase, containing a surfactant composition as defined herein at a concentration above CMC, is brought into contact with an ultrafiltration membrane under pressure, to obtain a permeate flow and a retentate flow. The retentate flow will have a higher concentration of PFAS than the PFAS-contaminated aqueous phase entering the ultrafiltration unit, whereas the aqueous permeate flow will have a reduced PFAS concentration. It is contemplated that the PFAS are captured within micelles, as well as at the surface of micelles, and therefore will be retained essentially in the retentate flow.

In some embodiments of the invention the PFAS containing water is treated with a surfactant composition as described herein by the use of ultrafiltration, in a reiterative manner. Thus, in some embodiments, the permeate, containing a reduced amount of PFAS compared to the aqueous flow entering the ultrafiltration device, will be submitted to a further addition of a surfactant composition containing a cationic surfactant and optionally a nonionic surfactant, which composition may be the same as the previously added surfactant composition or different, and will thereafter again be brought into contact with an ultrafiltration device, which may be the same as the device used in the previous filtration step, or different.

In some embodiments, the reiteration is achieved using a recirculation system, allowing the permeate to be recirculated a number of times through the ultrafiltration unit containing an ultrafilter, each time adding a surfactant composition in an amount exceeding the amount necessary to reach CMC in the aqueous phase, and each time separating a retentate enriched in PFAS and a permeate having a reduced concentration of PFAS.

The recirculation may be repeated a predetermined number of times, e.g. from 1 to 5 times, or from 1 to 3 times (though if necessary, e.g. in the case of heavily contaminated water, even higher number of reiterations may be used), or may be repeated until analysis of the ultrafiltration permeate indicates that a satisfactory low PFAS concentration has been reached.

In some embodiments, thus, the method for removing PFAS from a PFAS-containing aqueous phase comprises (i) adding a surfactant composition to said aqueous phase, said surfactant composition comprising at least one cationic surfactant, to allow the surfactant(s) to form micelles in said aqueous phase; and (ii) bringing said micelle-containing aqueous phase in contact with an ultrafiltration membrane under pressure, to obtain a permeate flow aqueous phase having a reduced concentration of PFAS.

In some embodiments, the method for removing PFAS from a PFAS-containing aqueous phase comprises (1) adding a surfactant composition to said aqueous phase, said surfactant composition comprising at least one cationic surfactant, to allow the surfactant(s) to form micelles in said aqueous phase;

(2) bringing said micelle-containing aqueous phase in contact with an ultrafiltration membrane under pressure, to obtain an aqueous phase permeate flow having a reduced concentration of PFAS;

(3) adding a surfactant composition to said aqueous phase having a reduced concentration of PFAS, said surfactant composition comprising at least one cationic surfactant, to allow the surfactant(s) to form micelles in said aqueous phase having a reduced concentration of PFAS;

(4) bringing said micelle-containing aqueous phase, having a reduced concentration of PFAS, in contact with an ultrafiltration membrane under pressure, to obtain an aqueous phase permeate flow having a further reduced concentration of PFAS; and optionally repeating (3) and (4) one or more further times, e.g. 1, 2, 3 or 4 times.

In some embodiments, the method for removing PFAS from a PFAS-containing aqueous phase comprises (1) adding a surfactant composition to said aqueous phase containing PFAS at an initial concentration $c_0$ of PFAS, said surfactant composition comprising at least one cationic surfactant, to allow the surfactant(s) to form micelles in said aqueous phase;

(2) bringing said micelle-containing aqueous phase in contact with an ultrafiltration membrane under pressure, to obtain an aqueous phase permeate flow having a reduced concentration $c_1$ of PFAS; optionally (3) adding a surfactant composition to said aqueous phase having a reduced concentration $c_1$ of PFAS, said surfactant composition comprising at least one cationic surfactant, to allow the surfactant(s) to form micelles in said aqueous phase having a reduced concentration $c_1$ of PFAS; and (4) bringing said micelle-containing aqueous phase, having a reduced concentration $c_1$ of PFAS, in contact with an ultrafiltration membrane under pressure, to obtain an aqueous phase permeate flow having a further reduced concentration $c_2$ of PFAS; and (5) optionally repeating (3) and (4) one or more further times, e.g. 1, 2, 3 or 4 more times, e.g. a preselected number of times, or, for example, until $c_{n+1}$ is essentially equal to $c_n$.

In some embodiments, the method for removing PFAS from a PFAS-containing aqueous phase comprises (1) adding a surfactant composition to said aqueous phase containing PFAS at an initial concentration $c_0$ of PFAS, said surfactant composition comprising at least one cationic surfactant, to allow the surfactant(s) to form micelles in said aqueous phase;

(2) bringing said micelle-containing aqueous phase in contact with an ultrafiltration membrane under pressure, to obtain an aqueous phase permeate flow having a reduced concentration $c_1$ of PFAS;

(3) adding a surfactant composition to said aqueous phase having a reduced concentration $c_1$ of PFAS, said surfactant composition comprising at least one cationic surfactant, to allow the surfactant(s) to form micelles in said aqueous phase having a reduced concentration $c_1$ of PFAS;

(4) bringing said micelle-containing aqueous phase, having a reduced concentration $c_1$ of PFAS, in contact with an ultrafiltration membrane under pressure, to obtain an aqueous phase permeate flow having a further reduced concentration $c_2$ of PFAS; and optionally repeating (3) and (4) one or more further times, e.g. 1, 2, 3 or 4 more times, e.g. a preselected number of times, or, for example, until $c_{n+1}$ is essentially equal to $c_n$.

In some embodiments, the method for removing PFAS from a PFAS-containing aqueous phase comprises (1) adding a surfactant composition to said aqueous phase, containing PFAS at an initial concentration $c_0$, said surfactant composition comprising at least one cationic surfactant, to allow the surfactant(s) to form micelles in said aqueous phase;

(2) bringing said micelle-containing aqueous phase in contact with an ultrafiltration membrane under pressure, to obtain an aqueous phase permeate flow having a reduced concentration $c_1$ of PFAS;

(3) determining a concentration of one or more PFAS in the permeate flow aqueous phase having a reduced concentration of PFAS; and optionally (4) if the concentration determined in (3) is higher than a threshold value, adding a surfactant composition to said aqueous phase having a reduced concentration $c_1$ of PFAS, said surfactant composition comprising at least one cationic surfactant, to allow the surfactant(s) to form micelles in said aqueous phase having a reduced concentration $c_1$ of PFAS; and (5) bringing said micelle-containing aqueous phase, having a reduced concentration $c_1$ of PFAS, in contact with an ultrafiltration membrane under pressure, to obtain an aqueous phase permeate flow having a further reduced concentration $c_2$ of PFAS; and optionally repeating (3) and (4) one or more further times, e.g. 1, 2, 3 or 4 more times, e.g. a preselected number of times, or until the concentration determined in (3) does not exceed a threshold value.

By repeating the treatment of PFAS contaminated water with surfactant composition as defined herein, in several iterations, PFAS can be removed by ultrafiltration, to below detection limit of PFAS analysis.

In some embodiments, in the step of determining a concentration of one or more PFAS in the aqueous phase (e.g. the permeate flow aqueous phase), as mentioned herein above, the concentration of at least one PFAS selected from PFAS Sum 11 is determined, e.g. the total concentration of PFAS Sum 11 is determined.

The surfactant composition added at each step may be as generally described herein above, e.g. it may be a cationic surfactant such as CTAB or CTAC or a concentrated water solution thereof.

In some other embodiments, it is contemplated that rather than submitting the aqueous phase to recirculation through one and the same ultrafiltration membrane, ultrafiltration may be performed using several ultrafilters in series, either the same type of ultrafilter, or different types, e.g. having different molecular weight cut-off sizes, in a method comprising adding a micelle-forming amount of a surfactant composition to the permeate flow exiting one ultrafilter, whereby which micelle forming amount and surfactant may be different for each point of addition.

Additionally, combinations of recirculation in one and the same ultrafilter and series of ultrafiltration units are contemplated as possible.

Figures 3A, 3B:
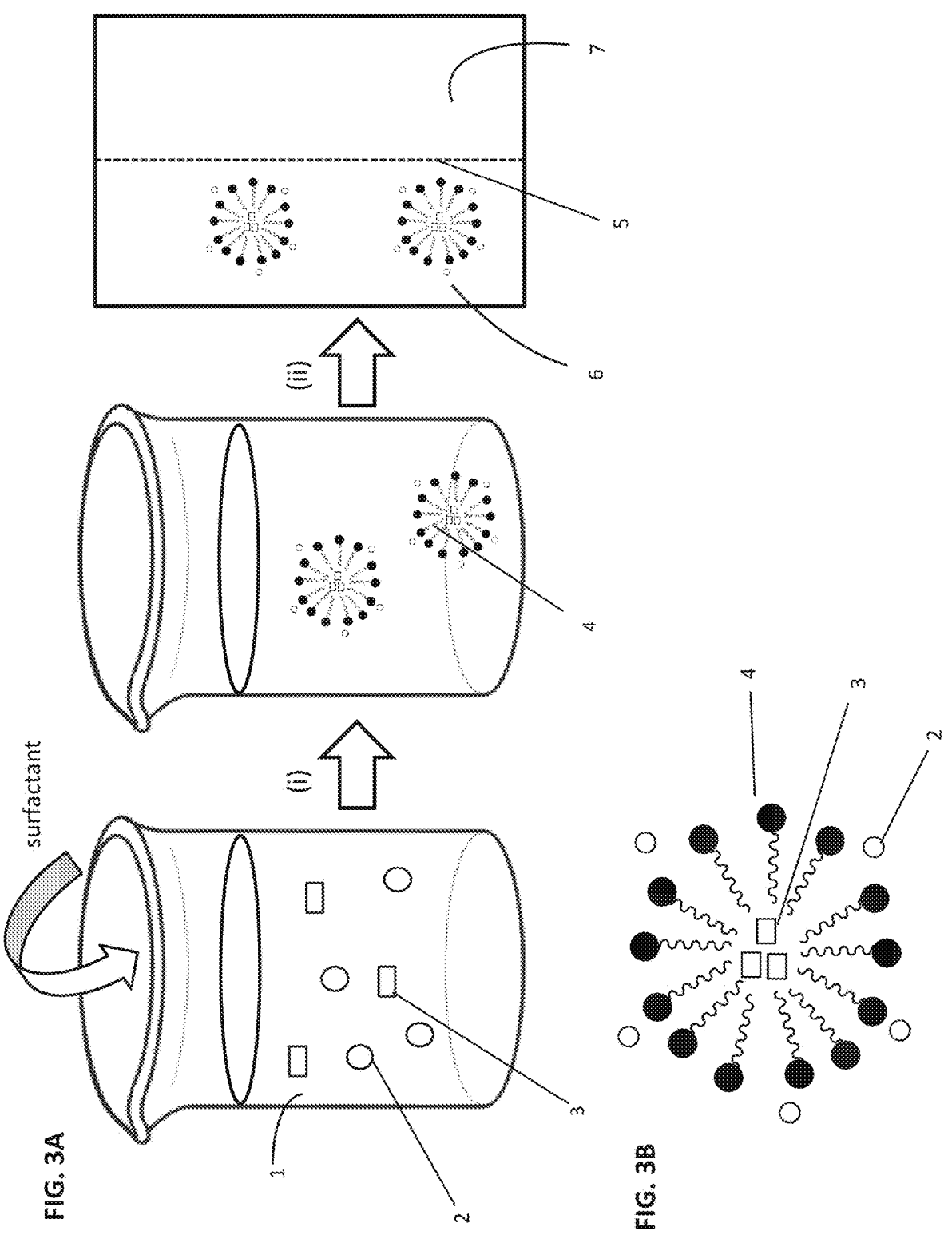
FIG. 3A illustrates the general principle whereby PFAS are removed from water, by addition of surfactant, followed by ultrafiltration.
FIG. 3B illustrates a micelle carrying PFAS at the micelle surface and in the micelle interior, as formed during the process.

A principle of the invention is as generally illustrated in FIG. 3A, wherein a surfactant composition ("surfactant") as described herein is added to PFAS-containing water 1, at a concentration allowing for micelles to form. It is contemplated that the PFAS present in the aqueous phase may be anionic compounds 2 as well as nonionic compounds 3. The anionic PFAS 2 will associate with the micelles at the micelle surface, as counter ions to the cationic surfactants of the micelles, while the nonionic PFAS 3 will essentially partition to the hydrophobic space within the micelles, to form PFAS-carrying micelles 4, as also shown in FIG. 3B. The reaction is considered to be rapid in comparison to ultrafiltration and therefore the solution can be essentially immediately ultrafiltered through an ultrafiltration membrane 5 having a molecular weight cutoff that is smaller than the size of the formed micelles 4, to obtain a retentate 6 having increased concentration of PFAS and permeate 7 having a reduced concentration of PFAS (not shown).

It is an advantageous feature of the inventive method that the retentate fraction of the treated water is quite small, generally accounting for less than 15% by volume of the inflowing volume of water, or even less than 10% by volume. This reduces the problem inherent in large volumes of wastewater.

Advantageously, a reduction of the initial concentration of PFAS in the water by at least 50%, at least 60%, at least 70%, at least 75%, at least 80%, at least 85%, at least 90%, at least 95%, at least 97%, at least 98%, at least 99%, or even higher, e.g. down to detection level, may be achieved according to the invention.

The efficiency of the removal of PFAS from PFAS contaminated water depends not only on the choice of surfactant, but also on the molecular weight cutoff of the selected ultrafiltration membrane. Generally, an optimal molecular weight cutoff for the ultrafiltration membranes has been found to be below 100 kDa, more preferably below 50 kDa, even more preferably below 30 kDa, e.g. from 5 to 20 kDa. For example, a membrane having a molecular weight cutoff of from 5 to 100 kDa may be used, or from from 5 to 50 kDa, e.g. from 5 to 30 kDa.

The invention has been shown to work in small scale ultrafiltration equipment for laboratory use such as centrifuge tubes fitted with a membrane, or tangential flow ultrafiltration equipment for laboratory use capable of treating 100 ml up to several litres, as well as on a large scale, in ultrafiltration equipment used for the treatment of cubic meters of PFAS-contaminated water.

The invention is illustrated by the following non-limiting Examples. For comparison, Reference Examples, not according to the invention, are also described.

EXAMPLES

Materials

All surfactants used were of commercially available quality and obtained from commercial chemical suppliers, e.g. in the form of commercially available detergents. The waters tested were contaminated waters obtained from various sources of PFAS contaminated sites located in Sweden. The ultrafiltration membranes were commercially available membranes obtained from suppliers of ultrafiltration equipment.

PFAS Analysis

The waters were analyzed in every step by authorized environmental analysis laboratories located in Sweden, the analysis of the water was carried out by LC-MS-MS.

General Procedure for Purification of PFAS Contaminated Water

All experiments were conducted in accordance with the general procedure depicted in FIG. 4. Cationic surfactant ("Cationic detergent") was added to PFAS contaminated water, the mixture was subjected to mixing for a few seconds and then passed through an ultrafiltration membrane. From the ultrafiltration process two fractions were generally obtained, the major fraction, usually consisting of 90-95% of the total volume, was the permeate, having a reduced concentration of PFAS, compared to the non-filtered water. The minor fraction, usually consisting of 5-10% of the total volume, was retained by the membrane and contained micelles carrying PFAS.

General Procedure 1

To a sample of 15 ml PFAS contaminated water was added a surfactant, the sample was shaken for 1-5 seconds and then transferred to an ultrafiltration centrifuge tube, Vivaspin® Turbo 15 with different molecular weight cutoff values, as indicated in the Examples. The centrifuge tube was then centrifuged at 3000 rpm for 15 minutes and the permeate was analyzed for PFAS. The result shown is essentially for PFAS Sum 11.

Example 1

Water: Leachate from landfill
Surfactant: Cetyltrimethylammonium bromide (CTAB)
Surfactant concentration: 3 g/L
Membrane molecular weight cutoff: 10 kDa The experiment was performed according to General Procedure 1 by adding CTAB to the water in an amount of 3 g/L. As a reference, the experiment was also performed without addition of surfactant. The results are shown in Table 1, where the remaining concentration of PFAS Sum 11 ("Residual PFAS Sum 11") is also indicated in % of the amount measured in the untreated water.

TABLE 1

| Treatment | Untreated | Ultrafiltration, no surfactant | Ultrafiltration with 3 g/L CTAB |
|---|---|---|---|
| PFAS Sum 11 (μg/L) | 57232 | 1157.3 | 54.31 |
| Residual PFAS Sum 11 (%) | 100 | 2.0 | 0.09 |

Example 2

Water: Leachate from landfill
Surfactant: CTAB
Surfactant concentration: 1 g/L
Membrane molecular weight cutoff: 5 kDa The experiment was performed according to General Procedure 1, by adding CTAB to the water in an amount of 1 g/L. As a reference, the experiment was also performed without addition of surfactant. The results are shown in Table 2.

TABLE 2

| Treatment | Untreated | Ultrafiltration, no surfactant | Ultrafiltration with 1 g/L CTAB |
|---|---|---|---|
| PFAS Sum 11 (μg/L) | 25 | 20 | 1 |
| Residual PFAS Sum 11 (%) | 100 | 80 | 4 |

Example 3

Water: Leachate from landfill
Surfactant: CTAB
Surfactant concentration: 5 g/L
Membrane molecular weight cutoff: 10 kDa The experiment was performed according to General Procedure 1, by adding CTAB to the water in an amount of 5 g/L. As a reference, the experiment was also performed without addition of surfactant. The results are shown in Table 3.

TABLE 3

| Treatment | Untreated | Ultrafiltration, no surfactant | Ultrafiltration with 5 g/L CTAB |
|---|---|---|---|
| PFAS Sum 11 (μg/L) | 9970 | 1659 | 159 |
| Residual PFAS Sum 11 (%) | 100 | 17 | 1.6 |

Example 4

Water: PFAS contaminated water
Surfactant: Luviquat® Mono LS (CAS Number: 68002-60-8)
Surfactant concentration: 1 g/L
Membrane molecular weight cutoff: 5 kDa Luviquat® Mono LS is an aqueous solution of lauryl/myristyltrimethylammonium-methosulfate, a cationic quaternary ammonium salt, sold e.g. by Sigma Aldrich, having a solid content of about 30%.

The experiment was performed according to General Procedure 1, by adding Luviquat Mono LS to the water in an amount of 1 g/L (based on dry weight of the surfactant). The results are shown in Table 4.

TABLE 4

| Treatment | Untreated | Ultrafiltration with 1 g/L Luviquat ® Mono LS |
|---|---|---|
| PFAS Sum 11 (μg/L) | 20 | 8.2 |
| Residual PFAS Sum 11 (%) | 100 | 41 |

Example 5

Water: PFAS contaminated water
Surfactant: Tetranyl® CO-40 (CAS Number 155042-51-6)
Surfactant concentration: 0.5 g/L
Membrane molecular weight cutoff: 10 kDa Tetranyl® CO-40 is dioleoylethyl hydroxyethylmonium methosulfate, a cationic quaternary ammonium salt, sold e.g. by Kao Chemicals.

The experiment was performed according to General Procedure 1, by adding Tetranyl® CO-40 to the water in an amount of 0.5 g/L. As a reference, the experiment was also performed without addition of surfactant. The results are shown in Table 5.

TABLE 5

| Treatment | Untreated | Ultrafiltration, no surfactant | Ultrafiltration with 0.5 g/l Tetranyl ® CO-40 |
|---|---|---|---|
| PFAS Sum 11 (μg/L) | 15.08 | 7.84 | 2.43 |
| Residual PFAS Sum 11 (%) | 100 | 52 | 16 |

Example 6

Water: PFAS contaminated water
Surfactant: Tetranyl® CO-40
Surfactant concentration: 5 g/L
Membrane molecular weight cutoff: 10 kDa The experiment was performed according to General Procedure 1, by adding Tetranyl® CO-40 to the water in an amount of 5 g/L. As a reference, the experiment was also performed without addition of surfactant. The results are shown in Table 6.

TABLE 6

| Treatment | Untreated | Ultrafiltration, no surfactant | Ultrafiltration with 0.5 g/l Tetranyl ® CO-40 |
|---|---|---|---|
| PFAS Sum 11 (μg/L) | 15.08 | 7.84 | 0.47 |
| Residual PFAS Sum 11 (%) | 100 | 52 | 3.1 |

Example 7

Water: PFAS contaminated water
Surfactant: Dehyquart® H 81
Surfactant concentration: 2.5 g/L
Membrane molecular weight cutoff: 10 kDa Dehyquart® H 81 (by BASF) is a pseudocationic surfactant in the form of a polyglycol-polyamine condensation resin (INCI name: PEG-15 Cocopolyamine).

The experiment was performed according to General Procedure 1, by adding Dehyquart® H 81 to the water in an amount of 2.5 g/L. The results are shown in Table 7.

TABLE 7

| Treatment | Untreated | Ultrafiltration with 2.5 g/L Dehyquart ® H 81 |
|---|---|---|
| PFAS Sum 11 (μg/L) | 12.33 | 9.96 |
| Residual PFAS Sum 11 (%) | 100 | 81 |

Reference Example 8

Water: Leachate from landfill

Surfactant: Empigen® BB

Surfactant concentration: 5 g/L

Membrane molecular weight cutoff: 3 kDa

Empigen® BB is a 30% dry weight aqueous solution of a lauryl dimethyl betaine, an amphoteric surfactant.

The experiment was performed according to General Procedure 1, by adding Empigen® BB to the water in an amount of 5 g/L of surfactant (by dry weight of the surfactant). The results are shown in Table 8.

TABLE 8

| Treatment | Untreated | Ultrafiltration with 5 g/L Empigen ® BB |
|---|---|---|
| PFAS Sum 11 (µg/L) | 3867.37 | 648.66 |
| Residual PFAS Sum 11 (%) | 100 | 17 |

Reference Example 9

Water: Leachate from landfill

Surfactant: Cremophor EL

Surfactant concentration: 5 g/L

Membrane molecular weight cutoff: 3 kDa

Cremophor is a nonionic surfactant obtained by ethoxylation of hydrogenated castor oil.

The experiment was performed according to General Procedure 1, by adding Cremophor to the water in an amount of 5 g/L. The results are shown in Table 9.

TABLE 9

| Treatment | Untreated | Ultrafiltration with 5 g/L Cremophor EL |
|---|---|---|
| PFAS Sum 11 (µg/L) | 3867.37 | 2697.62 |
| Residual PFAS Sum 11 (%) | 100 | 70 |

REFERENCE EXAMPLES 10-13 and EXAMPLES 14-16 were performed on PFAS-containing water having a PFAS concentration, in terms of PFAS Sum 11, of 25.13 µg/L.

Reference Example 10

Water: PFAS contaminated water (25.13 µg/L of PFAS Sum 11)

No surfactant added.

Membrane molecular weight cutoff: 10 kDa

The experiment was performed according to General Procedure 1, but without addition of surfactant. The results are shown in Table 10.

TABLE 10

| Treatment | Ultrafiltration, no surfactant |
|---|---|
| PFAS Sum 11 (µg/L) | 12.07 |
| Residual PFAS Sum 11 (%) | 48 |

Reference Example 11

Water: PFAS contaminated water (25.13 µg/L of PFAS Sum 11)

Surfactant: Sodium dodecyl sulfate (SDS)

Surfactant concentration: 3 g/L

Membrane molecular weight cutoff: 10 kDa

The experiment was performed according to General Procedure 1, by adding SDS to the water in an amount of 3 g/L. The results are shown in Table 11.

TABLE 11

| Treatment | Ultrafiltration with 3 g/L SDS |
|---|---|
| PFAS Sum 11 (µg/L) | 20.59 |
| Residual PFAS Sum 11 (%) | 82 |

Reference Example 12

Water: PFAS contaminated water (25.13 µg/L of PFAS Sum 11)

Surfactant: Glucopon® 600 CSUP, a nonionic surfactant

Surfactant concentration: 3 g/L

Membrane molecular weight cutoff: 10 kDa

Glucopon® CSUP is a lauryl/myristyl/1 glucoside nonionic surfactant sold by BASF. The experiment was performed according to General Procedure 1, by adding Glucopon® CSUP to the water in an amount of 3 g/L (based on dry weight of the surfactant). The results are shown in Table 12.

TABLE 12

| Treatment | Ultrafiltration with 3 g/L Glucopon ® 600 CSUP |
|---|---|
| PFAS Sum 11 (µg/L) | 13.59 |
| Residual PFAS Sum 11 (%) | 54 |

Reference Example 13

Water: PFAS contaminated water (25.13 µg/L of PFAS Sum 11)

Surfactant: Mixture of Glucopon® 600 CSUP and SDS

Surfactant concentration: 1 g/L of each surfactant

Membrane molecular weight cutoff: 10 kDa

The experiment was performed according to General Procedure 1, by adding the indicated surfactant mixture to the water in a total amount of 2 g/L. The results are shown in Table 13.

TABLE 13

| Treatment | Ultrafiltration with 1 g/L Glucopon ® 600 CSUP and 1 g/L SDS |
|---|---|
| PFAS Sum 11 (µg/L) | 18.67 |
| Residual PFAS Sum 11 (%) | 74 |

Example 14

Water: PFAS contaminated water (25.13 µg/L of PFAS Sum 11)

Surfactant: Luviquat® HOLD (CAS Number 174761-16-1) (solids content 20%)

Surfactant concentration: 3 g/L

Membrane molecular weight cutoff: 10 kDa

Luviquat® HOLD is a viscous liquid containing Poly-quaternium-68 (Quaternium-68, CAS Number 827346-45-2), i.e. 1-ethenyl-2-pyrrolidinone, polymer with 1-ethenylimidazole and 1-ethenyl-3-methylimidazolium methyl sulfate, also referred to as 1H-imidazolium, 1-ethenyl-3-methyl-, methyl sulfate (1:1), polymer with 1-ethenyl-1H-imidazole, 1-ethenyl-2-pyrrolidinone and 2-methyl-2-propenamide (Mw 510.6 g), a polymeric cationic surfactant.

The experiment was performed according to General Procedure 1, by adding Luviquat® HOLD to the water in an amount of 3 g/L (based on dry weight of the surfactant). The results are shown in Table 14.

TABLE 14

| Treatment | Ultrafiltration, with 3 g/L Luviquat ® HOLD |
| --- | --- |
| PFAS Sum 11 (µg/L) | 9.62 |
| Residual PFAS Sum 11 (%) | 38 |

Example 15

Water: PFAS contaminated water (25.13 µg/L of PFAS Sum 11)

Surfactant composition Mixture of Glucopon® CSUP and Luviquat® Mono LS

Surfactant concentration: 2 g/L respectively

Membrane molecular weight cutoff: 10 kDa

The experiment was performed according to General Procedure 1, by adding the surfactant mixture to the water in a total amount of 4 g/L. The results are shown in Table 15.

TABLE 15

| Treatment | Ultrafiltration with 2 g/L Glucopon ® CSUP and 2 g/L Luviquat ® Mono LS |
| --- | --- |
| PFAS Sum 11 (µg/L) | 1.04 |
| Residual PFAS Sum 11 (%) | 4.1 |

Example 16

Water: PFAS contaminated water (25.13 µg/L of PFAS Sum 11)

Surfactant: Mixture of Glucopon® CSUP and Luviquat® Mono LS

Surfactant concentration: 1 g/L of each surfactant

Membrane molecular weight cutoff: 10 kDa

The experiment was performed according to General Procedure 1, by adding the surfactant mixture to the water in a total amount of 2 g/L. The results are shown in Table 16.

TABLE 16

| Treatment | Ultrafiltration with 1g/L Glucopon ® CSUP and 1 g/L Luviquat ® Mono LS |
| --- | --- |
| PFAS Sum 11 (µg/L) | 2.09 |
| Residual PFAS Sum 11 (%) | 8.3 |

Figure 5:
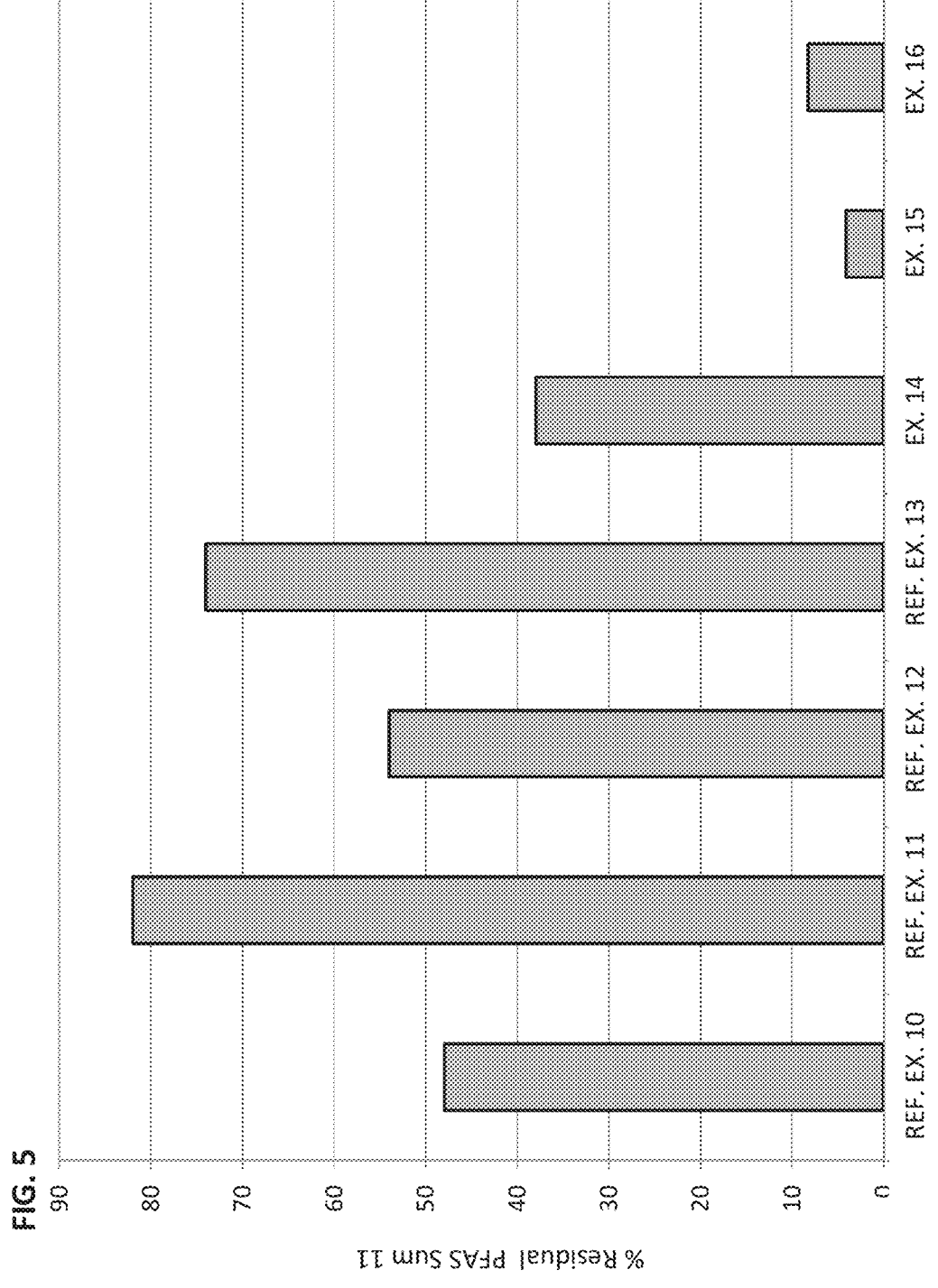
FIG. 5 is a bar chart showing remaining portion of PFAS, expressed as % residual % PFAS Sum 11 in water having an initial PFAS Sum 11 concentration of 25.13 μg/L of in water having undergone ultrafiltration without surfactant (REF. EX. 10), or with addition of anionic surfactant (REF. EX. 11), nonionic surfactant (REF. EX. 12), a mixture of anionic and nonionic surfactants (REF. EX. 13), cationic surfactant (EX. 14) or a mixture of cationic and nonionic surfactant (EX. 15 and EX. 16).
a FIG. 6 is a graph showing the concentration (in μg/l) of PFAS Sum 11 in water initially containing PFAS Sum 11 at a concentration of 12 μg/L after ultrafiltration, without addition of surfactant or with addition of different amounts of the cationic surfactant cetyltrimethylammonium chloride (CTAC).

The results of REFERENCE EXAMPLES 10-13 and EXAMPLES 14-16, in terms of % of residual PFAS Sum 11 based on the concentration of PFAS Sum 11 in the untreated water, are illustrated in FIG. 5.

Example 17

Water: Leachate from landfill

Surfactant: CTAB

Surfactant concentration: 5 g/L

Membrane molecular weight cutoff: 50 kDa

The experiment was performed according to General Procedure 1, by adding CTAB to the water in an amount of 5 g/L. As a reference, the experiment was also performed without addition of surfactant. The results are shown in Table 17.

TABLE 17

| Treatment | Untreated | Ultrafiltration, with 5 g/L CTAB |
| --- | --- | --- |
| PFAS Sum 11 (µg/L) | 9970 | 6387 |
| Residual PFAS Sum 11 (%) | 100 | 64 |

General Procedure 2

To a sample of 0.3-1 L PFAS contaminated water was added a surfactant composition, the sample was stirred for 1-5 minutes and then subjected to tangential flow ultrafiltration in a Vivaflow 50 polyether sulphone ultrafiltration filter. The tangential flow filtration was performed until only 10% of the original volume remained in the retentate. The obtained permeate was analyzed for PFAS.

REFERENCE EXAMPLE 18 and EXAMPLES 19-21 were all performed on PFAS-containing water having a PFAS concentration, in terms of PFAS Sum 11, of 12 µg/L.

Reference Example 18

Water: PFAS contaminated water (12 µg/L of PFAS Sum 11)

No surfactant added

Membrane molecular weight cutoff: 10 kDa

The experiment was performed according to General Procedure 2, but without addition of surfactant. The results are shown in Table 18.

TABLE 18

| Treatment | Ultrafiltration, no surfactant |
| --- | --- |
| PFAS Sum 11 (µg/L) | 1.6 |
| Residual PFAS Sum 11 (%) | 12.5 |

Example 19

Water: PFAS contaminated water (12 µg/L of PFAS Sum 11)
Surfactant: CTAC
Surfactant concentration: 0.25 g/L
Membrane molecular weight cutoff: 10 kDa The experiment was performed according to General Procedure 2, with addition of 0.25 g/L of CTAC as a surfactant. The results are shown in Table 19.

TABLE 19

| Treatment | Ultrafiltration with 0.25 g/L CTAC |
| --- | --- |
| PFAS Sum 11 (µg/L) | 1.8 |
| Residual PFAS Sum 11 (%) | 15 |

Example 20

Water: PFAS contaminated water (12 µg/L of PFAS Sum 11)
Surfactant: CTAC
Surfactant concentration: 0.5 g/L
Membrane molecular weight cutoff: 10 kDa The experiment was performed according to General Procedure 2, with addition of 0.5 g/L of CTAC as a surfactant. The results are shown in Table 20.

TABLE 20

| Treatment | Ultrafiltration with 0.5 g/L CTAC |
| --- | --- |
| PFAS Sum 11 (µg/L) | 0.85 |
| Residual PFAS Sum 11 (%) | 7.1 |

Example 21

Water: PFAS contaminated water (12 µg/L of PFAS Sum 11)
Surfactant: CTAC
Surfactant concentration: 1 g/L
Membrane molecular weight cutoff: 10 kDa The experiment was performed according to General Procedure 2, with addition of 1 g/L of CTAC as a surfactant. The results are shown in Table 21.

TABLE 21

| Treatment | Ultrafiltration with 1 g/L CTAC |
| --- | --- |
| PFAS Sum 11 (µg/L) | 0.047 |
| Residual PFAS Sum 11 (%) | 0.39 |

Figure 6:
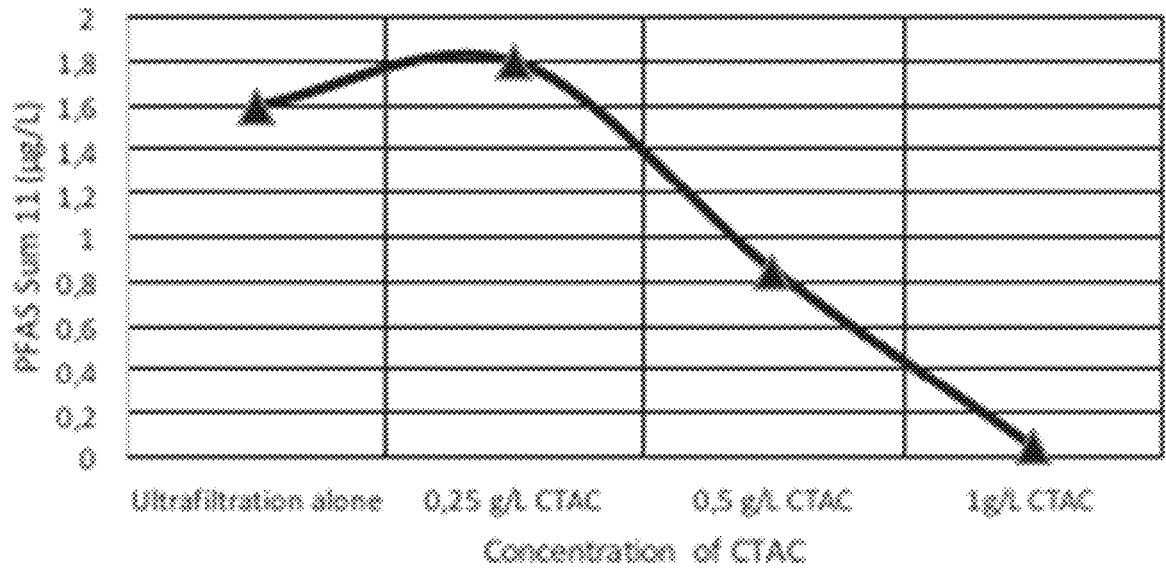

The results of REFERENCE EXAMPLE 18 and EXAMPLES 19-21, in terms of % of residual PFAS Sum 11 based on the concentration of PFAS Sum 11 in the untreated water, are illustrated in FIG. 6.

EXAMPLES 22-24 were all performed on PFAS-containing water having a PFAS concentration, in terms of PFAS Sum 11, of 18 µg/L.

Example 22

Water: PFAS contaminated water (18 µg/L of PFAS Sum 11)
Surfactant: Cetyltrimethylammonium chloride (CTAC)
Surfactant concentration: 0.5 g/L
Membrane molecular weight cutoff: 10 kDa The experiment was performed according to General Procedure 2, with addition of 0.5 g/L of CTAC as a surfactant. The results are shown in Table 22.

TABLE 22

| Treatment | Ultrafiltration with 0.5 g/L CTAC |
| --- | --- |
| PFAS Sum 11 (µg/L) | 1.1 |
| Residual PFAS Sum 11 (%) | 6.1 |

Example 23

Water: PFAS contaminated water (18 µg/L of PFAS Sum 11)
Surfactant: Cetyltrimethylammonium chloride (CTAC)
Surfactant concentration: 0.7 g/L
Membrane molecular weight cutoff: 10 kDa The experiment was performed according to General Procedure 2, with addition of 0.7 g/L of CTAC as a surfactant. The results are shown in Table 23.

TABLE 23

| Treatment | Ultrafiltration with 0.7 g/L CTAC |
| --- | --- |
| PFAS Sum 11 (µg/L) | 0.64 |
| Residual PFAS Sum 11 (%) | 3.6 |

Example 24

Water: PFAS contaminated water (18 µg/L of PFAS Sum 11)
Surfactant: Cetyltrimethylammonium chloride (CTAC)
Surfactant concentration: 1 g/L
Membrane molecular weight cutoff: 10 kDa The experiment was performed according to General Procedure 2, with addition of 1 g/L of CTAC as a surfactant. The results are shown in Table 24.

TABLE 24

| Treatment | Ultrafiltration with 1 g/L CTAC |
| --- | --- |
| PFAS Sum 11 (µg/L) | 0.48 |
| Residual PFAS Sum 11 (%) | 2.7 |

General Procedure 3

To a sample of 0.3-1 L PFAS contaminated water was added a surfactant composition, and the sample was stirred for 1-5 minutes and then subjected to tangential flow ultrafiltration in a Vivaflow® 50 polyether sulphone ultrafiltration filter. The tangential flow filtration was performed until only 10% of the original volume remained in the retentate. The obtained permeate was analyzed for PFAS. The procedure was repeated n more times, to give a total number of iterations of n+1.

Example 25

Water: Leachate from landfill
Surfactant: CTAB
Number of iterations: 4
Membrane molecular weight cutoff: 10 kDa The experiment was performed according to General Procedure 3, using different amounts of CTAB, as indicated in Table 25. The PFAS concentration was additionally measured in the leachate water before treatment, as well as in the water having undergone ultrafiltration in the absence of surfactant. The results are shown in Table 25.

TABLE 25

| Treatment | Untreated | Ultrafiltration, no surfactant | Ultrafiltration with CTAB | | | |
|---|---|---|---|---|---|---|
| Iteration No | — | — | 1 | 2 | 3 | 4 |
| CTAB conc. (g/L) | — | — | 3 | 3.3 | 5 | 5.1 |
| PFAS Sum 11 (µg/L) | 57232 | 1157.3 | 54.31 | 17.45 | 3.305 | 1.193 |
| Residual PFAS Sum 11 (%) | 100 | 2 | 0.09 | 0.03 | 0.006 | 0.002 |

Example 26

Water: PFAS contaminated water
Surfactant: CTAB
Number of iterations: 3
Membrane molecular weight cutoff: 10 kDa The experiment was performed according to General Procedure 3, using different amounts of CTAB, as indicated in Table 26. The PFAS concentration was additionally measured in the water before treatment. The results are shown in Table 26.

TABLE 26

| Treatment | Untreated | Ultrafiltration with CTAB | | |
|---|---|---|---|---|
| Iteration No | — | 1 | 2 | 3 |
| CTAB conc. (g/L) | — | 5 | 3.87 | 3 |
| PFAS Sum 11 (µg/L) | 193.2 | 0.628 | 0.444 | Not detected |
| Residual PFAS Sum 11 (%) | 100 | 0.33 | 0.23 | — |

General Procedure 4

To a 25 L sample of PFAS contaminated water was added a surfactant composition, and the sample was stirred for 1-5 minutes and then subjected to tangential flow ultrafiltration in a ultrafiltration unit with a filtration capacity of 40-100 L/h. The tangential flow filtration was performed until only 10% of the original liquid volume remained in the retentate. The obtained permeate was analyzed for PFAS. The procedure was repeated n times, to give a total number of iterations of n+1.

Example 27

Figure 7:
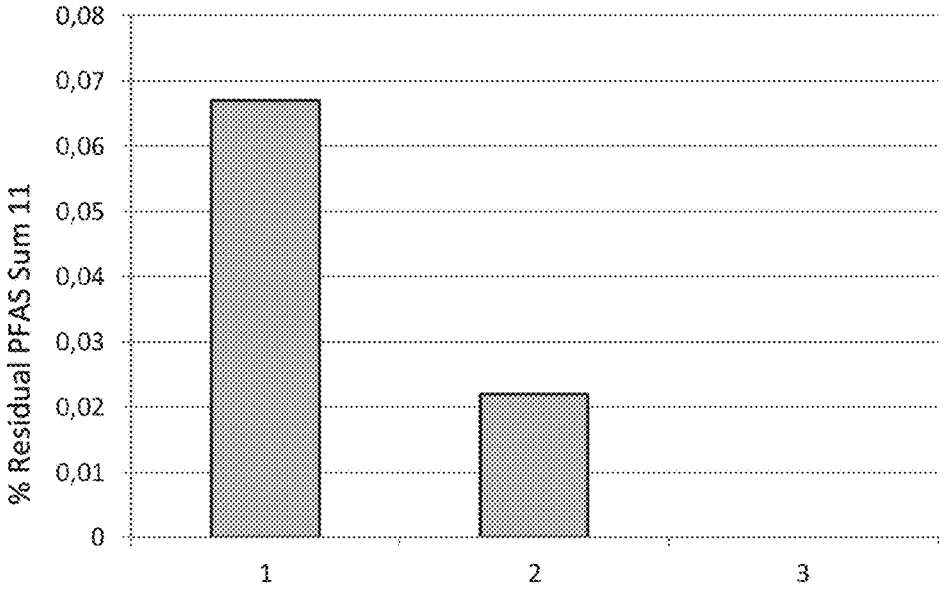
FIG. 7 is a bar chart showing remaining portion of PFAS, expressed as % residual % PFAS Sum 11 in water having an initial concentration of 69 μg/L after one (1), two (2), or three (3) iterations of the process in the presence of cetyltrimethylammonium chloride (CTAC) as a surfactant.

Water: PFAS contaminated water
Surfactant: CTAC
Number of iterations: 3
Membrane molecular weight cutoff: 10 kDa The experiment was performed according to General Procedure 4, using different amounts of CTAC, as indicated in Table 27. The PFAS concentration was additionally measured in the water before treatment. The results are shown in Table 27 and illustrated in FIG. 7.

TABLE 27

| Treatment | Untreated | Ultrafiltration with CTAC | | |
|---|---|---|---|---|
| Iteration No | — | 1 | 2 | 3 |
| Surfactant | — | CTAC | CTAC | CTAC |
| Surfactant conc. (g/L) | — | 3 | 3 | 3 |
| PFAS Sum 11 (µg/L) | 69 | 0.046 | 0.015 | not detected |
| Residual PFAS Sum 11 (%) | 100 | 0.067 | 0.022 | — |

REFERENCES

1. American Water Works Association Research Foundation; Ed. group Joël Mallevialle (1996). "Water treatment membrane processes." New York [u.a.]: McGraw Hill
2. Tamime, A. Y. "Membrane Processing Dairy and Beverage Applications". Chicester: Wiley.
3. Rizvi, Anil Kumar; Pabby, Ana Maria; Sastre, Syed S. H., eds. (2007). "Handbook of membrane separations: chemical, pharmaceutical, and biotechnological applications." Boca Raton, Fla.: CRC Press.
4. Clever, M.; Jordt, F.; Knauf, R.; Räbiger, N.; Rüdebusch, M.; Hilker-Scheibel, R. (1 Dec. 2000). "Process water production from river water by ultrafiltration and reverse osmosis". Desalination. 131 (1-3): 325-336.
5. Tamime, A. Y. "Membrane Processing Dairy and Beverage Applications." Chicester: Wiley
6. Kaustubha Mohanty, Mihir K. Purkait; "Membrane technologies and applications" 2012, CRC Press
7. Kandori, K., Schechter, R. S.; "Selection of surfactants for micellar-enhanced ultrafiltration", Separation Science and Technology (1990), 25(1-2), 83-108
8. Ponisseril Somasundaran, Shaohua Lu; "REMOVAL OF CONTAMINANTS FROM WATER USING SUGAR BASED SURFACTANT ENHANCED ULTRAFILTRATION", U.S. Pat. No. 8,002,988
9. Puasa S. W., Ruzitah M. S and Sharifah A. S. A. K; "An Oerview of Micellar—Enhanced Ultrafiltration in Wastewater Treatment Process", IPCBEE vol. 12 (2011)
10. Lehmler, HJ (2005). "Synthesis of environmentally relevant fluorinated surfactants—a review". Chemosphere. 58 (11): 1471-96.
11. Renner R (2006). "The long and the short of perfluorinated replacements". Environ. Sci. Technol. 40 (1): 12-3.
12. Calafat A M, Wong L Y, Kuklenyik Z, Reidy J A, Needham L L (2007). "Polyfluoroalkyl chemicals in the U.S. population: data from the National Health and Nutrition Examination Survey (NHANES) 2003-2004 and comparisons with NHANES 1999-2000". Environ. Health Perspect. 115 (11): 1596-602

13. Berger, U., Glynn, A., Holmström, K. E., Berglund, M., Ankarberg, H. E., Törnkvist, A.; "Fish consumption as a source of human exposure to perfluorinated alkyl substances in Sweden—Analysis of edible fish from Lake Vattern and the Baltic Sea", Chemosphere, Volume 76, Issue 6, August 2009, Pages 799-804

14. McCleaf, P., Englund, S., Östlund, A., Lindegren, K., Wiberg, K., Ahrens, L.; "Removal efficiency of multiple poly- and perfluoroalkyl substances (PFASs) in drinking water using granular activated carbon (GAC) and anion exchange (AE) column tests", Water research, Volume 120, 1 September 2017, Pages 77-87

15. Busch, J., Ahrens, L., Sturm, R., Ebinghaus, R.; "Polyfluoroalkyl compounds in landfill leachates", Environmental pollution, Volume 158, Issue 5, May 2010, Pages 1467-1471

The invention claimed is:

1. A method for removing PFAS from a PFAS-containing aqueous phase, said PFAS comprising at least one compound selected from perfluorobutanoic acid, perfluoropentanoic acid, perfluorohexanoic acid, perfluoroheptanoic acid, perfluorooctanoic acid, perfluorononanoic acid, perfluorodecanoic acid, perfluorobutanesulphonic acid, perfluorohexanesulphonic acid, perfluorooctanesulphonic acid, and 6:2 fluorotelomer sulfonate, said method comprising:

(i) adding to a volume of said PFAS-containing aqueous phase a surfactant composition comprising at least one cationic surfactant, to allow the surfactant to form micelles, said micelles capturing PFAS present in said PFAS-containing aqueous phase, and (ii) bringing said volume of PFAS-containing aqueous phase, containing said formed micelles carrying captured PFAS, into contact with an ultrafiltration membrane under pressure, to obtain a permeate flow aqueous phase having a reduced concentration of PFAS, wherein said at least one compound has a concentration reduced by at least 97% in the obtained permeate flow aqueous phase, and a retentate aqueous phase having a higher concentration of PFAS, wherein the retentate aqueous phase has a volume of less than 15% of the volume of the PFAS-containing aqueous phase in (i).

2. The method of claim 1, wherein the cationic surfactant comprises a C4-C20 aliphatic group as a hydrophobic moiety.

3. The method of claim 1, wherein the cationic surfactant comprises a hydrophilic moiety selected from amonium, methylammonium, dimethylammonium, trimethylammonium, hydroxyethylammonium, methyl hydroxyethylammonium, dimethyl hydroxyethylammonium, or polymers containing one or more of these groups.

4. The method of claim 1, wherein the PFAS further comprise one or more of perfluoroundecanoic acid, perfluorododecanoic acid, perfluorotridecanoic acid, perfluorotetradecanoic acid, perfluoropentanesulphonic acid, perfluoroheptanesulphonic acid, perfluorononanesulphonic acid, perfluorodecanesulphonic acid, perfluorododecanesulphonic acid, 4:2 fluorotelomer sulfonate, 8:2 fluorotelomer sulfonate, perfluorooctanesulphone amide, N-methyl perfluorooctanesulphone amide, N-ethyl perfluorooctanesulphone amide, N-methyl perfluorooctanesulphone amide ethanol, N-ethylperfluorooctanesulphone amide ethanol, perfluorooctanesulphone amide acetate, N-methyl perfluorooctanesulphone amide acetate, N-ethyl perfluorooctanesulphone amide acetate, 7H-perfluoroheptanoic acid, and perfluoro-3,7-dimethyloctanoic acid.

5. The method of claim 1, wherein the ultrafiltration membrane has a molecular weight cutoff of no more than 100 000 daltons.

6. The method of claim 1, wherein the ultrafiltration membrane has a molecular weight cutoff ranging from 1,000 to 30,000 daltons.

7. The method of claim 1, wherein the surfactant composition comprises at least one nonionic surfactant.

8. The method of claim 7, wherein the surfactant composition comprises cationic surfactant and nonionic surfactant at a weight ratio of from 1:100 to 100:1 of cationic surfactant to nonionic surfactant.

9. The method of claim 8, wherein said weight ratio is from 1:10 to 10:1.

10. The method of claim 9, wherein said weight ratio is from 1:5 to 5:1.

11. The method of claim 1, comprising (i) adding additional amounts of said surfactant composition comprising at least one cationic surfactant, to a subsequent PFAS-containing aqueous phase comprising the permeate flow aqueous phase having said reduced concentration of PFAS, to allow the surfactant to form micelles, said micelles capturing PFAS present in said subsequent PFAS-containing aqueous phase, and (ii) bringing said subsequent PFAS-containing aqueous phase containing micelles carrying captured PFAS into contact with an ultrafiltration membrane under pressure, to obtain a permeate flow aqueous phase having a further reduced concentration of PFAS.

12. The method of claim 11, comprising repeating (i) and (ii) as defined in claim 11 from 1 to 5 times.

13. The method of claim 1, comprising (iii) determining a concentration of one or more PFAS in the permeate flow aqueous phase having a reduced concentration of PFAS, and if a determined concentration in the permeate flow aqueous phase is higher than a predetermined threshold value, (i) adding a surfactant composition comprising at least one cationic surfactant, to a PFAS-containing aqueous phase comprising the permeate flow aqueous phase containing the reduced concentration of PFAS, to allow the surfactant to form micelles in said PFAS-containing aqueous phase, said micelles capturing PFAS present in said PFAS-containing aqueous phase, and (ii) bringing said PFAS-containing aqueous phase containing micelles carrying captured PFAS, into contact with an ultrafiltration membrane under pressure, to obtain a permeate flow aqueous phase having a further reduced concentration of PFAS.

14. The method of claim 1, wherein the aqueous phase is selected from land fill leach water, drainage water, groundwater and process water.

15. The method of claim 1, wherein the aqueous phase contains PFAS at an initial concentration ranging from 0.1 μg/L to 10 g/L.

16. The method of claim 1, wherein the retentate aqueous phase has a volume less than 10% of the volume of the PFAS-containing aqueous phase in (i).

17. The method of claim 1, wherein said at least one compound has a concentration that has been reduced by at least 99% in the obtained permeate flow aqueous phase.

* * * * *